US008303400B2

(12) United States Patent
Okada

(10) Patent No.: US 8,303,400 B2
(45) Date of Patent: Nov. 6, 2012

(54) GAMING MACHINE HAVING A FUNCTION OF THE NUMBER OF FREE GAMES ACCORDING TO THE RESULT OF A GAME IN WHICH A PLAYER SELECTS A CHOICE FROM AMONG MULTIPLE CHOICES

(75) Inventor: Kazuo Okada, Tokyo (JP)

(73) Assignee: Aruze Gaming America, Inc., Las Vegas, NV (US)

(*) Notice: Subject to any disclaimer, the term of this patent is extended or adjusted under 35 U.S.C. 154(b) by 0 days.

(21) Appl. No.: 13/217,752

(22) Filed: Aug. 25, 2011

(65) Prior Publication Data

US 2011/0313551 A1 Dec. 22, 2011

Related U.S. Application Data

(63) Continuation of application No. 11/937,405, filed on Nov. 8, 2007.

(60) Provisional application No. 60/905,049, filed on Mar. 6, 2007.

(51) Int. Cl.
*A63F 13/10* (2006.01)

(52) U.S. Cl. .......... 463/25

(58) Field of Classification Search .......... 463/16, 463/20, 25
See application file for complete search history.

(56) References Cited

U.S. PATENT DOCUMENTS

| | | | | |
|---|---|---|---|---|
| 4,685,677 | A * | 8/1987 | Demar et al. | 463/23 |
| 5,453,928 | A * | 9/1995 | Kaminkow et al. | 463/25 |
| 5,533,727 | A * | 7/1996 | DeMar | 463/23 |
| 6,213,874 | B1 * | 4/2001 | Heflin | 463/17 |
| 6,443,452 | B1 * | 9/2002 | Brune | 273/143 R |
| 6,491,584 | B2 * | 12/2002 | Graham et al. | 463/25 |
| 2002/0010017 | A1 * | 1/2002 | Bennett | 463/20 |
| 2002/0025846 | A1 * | 2/2002 | Bennett et al. | 463/20 |
| 2002/0025848 | A1 * | 2/2002 | Graham et al. | 463/25 |
| 2002/0025849 | A1 * | 2/2002 | Olive | 463/29 |
| 2002/0047238 | A1 * | 4/2002 | Ainsworth et al. | 273/292 |
| 2003/0069056 | A1 * | 4/2003 | Cormack et al. | 463/16 |

FOREIGN PATENT DOCUMENTS

AU 765887 * 9/2001

* cited by examiner

*Primary Examiner* — David L Lewis
*Assistant Examiner* — Matthew D. Hoel
(74) *Attorney, Agent, or Firm* — Lexyoume IP Meister, PLLC.

(57) ABSTRACT

A controller is provided which includes: a function whereby, in a case that the game mode has been switched to the free game mode, a mini game is executed; a function whereby, each time the mini game is executed, selection data is received from a first input device, and determination is made based upon the received selection data as to whether accumulated points are to be updated; a function whereby, in a case that determination has been made that the accumulated points are to be updated, the points that correspond to the received selection data are added to the accumulated points, thereby updating the accumulated points; and a function whereby, after the mini game has been executed a predetermined number of times, the number of extra free games, which are extra games provided in addition to the free game, is determined according to the updated accumulated points.

5 Claims, 19 Drawing Sheets

FIG. 7

SYMBOL DISPOSITION TABLE

| SYMBOL POSITION | SYMBOL | | | | |
|---|---|---|---|---|---|
| | FIRST REEL | SECOND REEL | THIRD REEL | FOURTH REEL | FIFTH REEL |
| 20 | BONUS | BONUS | BONUS | BONUS | BONUS |
| 19 | A | MASK | Q | A | 10 |
| 18 | HOLY CUP | K | K | TREASURE | SNAKE |
| 17 | TREASURE | COMPASS | 10 | Q | HOLY CUP |
| 16 | Q | MASK | K | K | J |
| 15 | 10 | Q | TREASURE | MASK | TREASURE |
| 14 | TREASURE | HOLY CUP | HOLY CUP | BONUS | WILD |
| 13 | WILD | J | J | Q | Q |
| 12 | J | BONUS | BONUS | SNAKE | HOLY CUP |
| 11 | MASK | HOLY CUP | TREASURE | 10 | A |
| 10 | J | A | WILD | WILD | WILD |
| 9 | HOLY CUP | Q | COMPASS | 10 | A |
| 8 | TREASURE | WILD | A | BONUS | 10 |
| 7 | A | A | 10 | Q | TREASURE |
| 6 | HOLY CUP | J | J | COMPASS | MASK |
| 5 | TREASURE | K | HOLY CUP | Q | 10 |
| 4 | A | TREASURE | TREASURE | K | TREASURE |
| 3 | Q | A | WILD | Q | K |
| 2 | COMPASS | HOLY CUP | TREASURE | HOLY CUP | COMPASS |
| 1 | 10 | TREASURE | K | A | TREASURE |
| 0 | K | Q | TREASURE | Q | MASK |

(BASIC GAME PROCESSING)

(MINI GAME PROCESSING)

FIG. 11

BASIC GAME RANDOM NUMBER TABLE
(RANDOM NUMBER EXTRACTION RANGE : 0～65535)

| SYMBOL | RANDOM NUMBER RANGE | DETERMINATION PROBABILITY |
|---|---|---|
| BONUS | 0 ～ 299 | 300 ／ 65536 |
| WILD | 300 ～ 300 | 1 ／ 65536 |
| SNAKE | 301 ～ 350 | 50 ／ 65536 |
| TREASURE BOX | 351 ～ 400 | 50 ／ 65536 |
| GOLDEN MASK | 401 ～ 450 | 50 ／ 65536 |
| HOLY CUP | 451 ～ 500 | 50 ／ 65536 |
| COMPASS&MAP | 501 ～ 550 | 50 ／ 65536 |
| A | 551 ～ 1550 | 1000 ／ 65536 |
| K | 1551 ～ 2550 | 1000 ／ 65536 |
| Q | 2551 ～ 3550 | 1000 ／ 65536 |
| J | 3551 ～ 4550 | 1000 ／ 65536 |
| 10 | 4551 ～ 9999 | 5449 ／ 65536 |
| BLANK | 10000 ～ 65535 | 55536 ／ 65536 |

FIG. 12

FREE GAME RANDOM NUMBER TABLE
(RANDOM NUMBER EXTRACTION RANGE : 0～65535)

| SYMBOL | RANDOM NUMBER RANGE | DETERMINATION PROBABILITY |
|---|---|---|
| BONUS | 0 ～ 999 | 1000 ／ 65536 |
| WILD | 1000 ～ 1009 | 10 ／ 65536 |
| SNAKE | 1010 ～ 1499 | 490 ／ 65536 |
| TREASURE BOX | 1500 ～ 1899 | 400 ／ 65536 |
| GOLDEN MASK | 1900 ～ 2299 | 400 ／ 65536 |
| HOLY CUP | 2300 ～ 2699 | 400 ／ 65536 |
| COMPASS&MAP | 2700 ～ 3099 | 400 ／ 65536 |
| A | 3100 ～ 3899 | 800 ／ 65536 |
| K | 3900 ～ 4699 | 800 ／ 65536 |
| Q | 4700 ～ 5499 | 800 ／ 65536 |
| J | 5500 ～ 6299 | 800 ／ 65536 |
| 10 | 6300 ～ 10099 | 3800 ／ 65536 |
| BLANK | 10100 ～ 65535 | 55436 ／ 65536 |

FIG. 13

WIN/LOSE DETERMINATION RANDOM NUMBER TABLE
(RANDOM NUMBER RANGE : 0～65535)

| WIN/LOSE TYPE | RANDOM NUMBER RANGE | DETERMINATION PROBABILITY |
|---|---|---|
| BIG | 0 ～ 29999 | 30000 ／ 65536 |
| SMALL | 30000 ～ 49999 | 20000 ／ 65536 |
| BLANK | 50000 ～ 65535 | 15536 ／ 65536 |

FIG. 14

POINTS ADDITION DETERMINATION RANDOM NUMBER TABLE
(RANDOM NUMBER RANGE : 0～65535)

| POINTS | RANDOM NUMBER RANGE | DETERMINATION PROBABILITY |
|---|---|---|
| 1 | 0 ～ 64999 | 65000 ／ 65536 |
| 2 | 65000 ～ 65499 | 500 ／ 65536 |
| 3 | 65500 ～ 65535 | 36 ／ 65536 |

FIG. 15

CLEAR POINTS CALCULATION RATIO TABLE

| NUMBER OF INSTANCES OF DETERMINATION THAT PLAYER HAS WON EXTRA FREE GAMES | CLEAR POINTS CALCULATION RATIO |
|---|---|
| 0 | 30% |
| 1 | 40% |
| 2 | 60% |
| 3 | 80% |
| 4 | 100% |

FIG. 16

EXTRA FREE GAMES TABLE

| ACCUMULATED POINTS | NUMBER OF EXTRA FREE GAMES |
|---|---|
| 0～20 | 10 |
| 21～50 | 30 |
| 50～100 | 50 |
| 100以上 | 70 |

GAMING MACHINE HAVING A FUNCTION OF THE NUMBER OF FREE GAMES ACCORDING TO THE RESULT OF A GAME IN WHICH A PLAYER SELECTS A CHOICE FROM AMONG MULTIPLE CHOICES

BACKGROUND OF THE INVENTION

1. Field of the Invention

The present invention relates to a gaming machine which changes the number of free games according to the results of a game in which a player can select a desired choice from among multiple choices.

2. Related Art

It is known that a type of conventional slot machine has a function whereby, in a case that a predetermined condition has been satisfied in a basic game, the game mode is switched to a free game mode which allows the player to play a game without spending any credits. In a case that the slot machine has entered the free game mode, the player has a chance to win a great amount of credit. For example, AU2000PQ6296 discloses a free game employed as a second game. In general, the number of such free games is randomly determined, or is set to a predetermined fixed number.

The present invention provides a gaming machine that offers a novel form of entertainment.

SUMMARY OF THE INVENTION

A first aspect of the present invention relates to a gaming machine having the following configuration. The gaming machine includes: memory which stores accumulated points that are updated according to the results of a mini game; a display which displays multiple selection regions; a first input device which outputs the selection data associated with the selection region selected by a player from among the multiple selection regions displayed on the display; a second input device which outputs a signal that starts a basic game; and a controller which provides: (a) a function whereby, upon receipt of the signal from the second input device, the basic game is started; (b) a function whereby, in a case that a predetermined condition has been satisfied, the game mode is switched from the basic game mode to the free game mode; (c) a function whereby, in a case that the game mode has been switched to the free game mode, the mini game is executed; (d) a function whereby, each time the mini game is executed, the selection data is received from the first input device, and determination is made based upon the received selection data as to whether the accumulated points are to be updated; (e) a function whereby, in a case that determination has been made that the accumulated points are to be updated, the points that correspond to the received selection data are added to the accumulated points, thereby updating the accumulated points; (f) a function whereby, after the mini game has been executed a predetermined number of times, the number of extra free games is determined according to the updated accumulated points; and (g) a function of executing the extra free game the determined number of times.

The gaming machine according to the first aspect of the present invention provides: (a) a function whereby, upon receipt of the signal from the second input device, the basic game is started; (b) a function whereby, in a case that a predetermined condition has been satisfied, the game mode is switched from the basic game mode to the free game mode; (c) a function whereby, in a case that the game mode has been switched to the free game mode, the mini game is executed; (d) a function whereby, each time the mini game is executed, the selection data is received from the first input device, and determination is made based upon the received selection data as to whether the accumulated points are to be updated; (e) a function whereby, in a case that determination has been made that the accumulated points are to be updated, the points that correspond to the received selection data are added to the accumulated points, thereby updating the accumulated points; (f) a function whereby, after the mini game has been executed a predetermined number of times, the number of extra free games is determined according to the updated accumulated points; and (g) a function of executing the extra free game the determined number of times.

A second aspect of the present invention relates to a gaming machine having the following configuration. The gaming machine includes: memory which stores accumulated points that are updated according to the results of a mini game; a display which displays multiple selection regions; a first input device which outputs the selection data associated with the selection region selected by a player from among the multiple selection regions displayed on the display; a second input device which outputs a signal that starts a basic game; and a controller which provides: (a) a function whereby, upon receipt of the signal from the second input device, the basic game is started; (b) a function whereby, in a case that a predetermined condition has been satisfied, the game mode is switched from the basic game mode to the free game mode; (c) a function whereby, in a case that the game mode has been switched to the free game mode, the mini game is executed; (d) a function whereby, each time the mini game is executed, the selection data is received from the first input device, and determination is made based upon the received selection data as to whether the accumulated points are to be updated; (e) a function whereby, in a case that determination has been made that the accumulated points are to be updated, the points that correspond to the received selection data are added to the accumulated points, thereby updating the accumulated points; (f) a function whereby, in a case that the updated accumulated points are at least equal to a predetermined number of points after the mini game has been executed a predetermined number of times, the number of extra free games is determined according to the updated accumulated points; and (g) a function of executing the extra free game the determined number of times.

The gaming machine according to the second aspect of the present invention provides: (a) a function whereby, upon receipt of the signal from the second input device, the basic game is started; (b) a function whereby, in a case that a predetermined condition has been satisfied, the game mode is switched from the basic game mode to the free game mode; (c) a function whereby, in a case that the game mode has been switched to the free game mode, the mini game is executed; (d) a function whereby, each time the mini game is executed, the selection data is received from the first input device, and determination is made based upon the received selection data as to whether the accumulated points are to be updated; (e) a function whereby, in a case that determination has been made that the accumulated points are to be updated, the points that correspond to the received selection data are added to the accumulated points, thereby updating the accumulated points; (f) a function whereby, in a case that the updated accumulated points are at least equal to a predetermined number of points after the mini game has been executed a predetermined number of times, the number of extra free games is determined according to the updated accumulated points; and (g) a function of executing the extra free game the determined number of times.

A third aspect of the present invention relates to a gaming machine having the following configuration. The gaming machine includes: memory which stores accumulated points that are updated according to the results of a mini game; a display which displays multiple selection regions; a first input device which outputs the selection data associated with the selection region selected by a player from among the multiple selection regions displayed on the display; a counter which stores the number of instances of determination that the player has won extra free games; a second input device which outputs a signal that starts a basic game; and a controller which provides: (a) a function whereby, upon receipt of the signal from the second input device, the basic game is started; (b) a function whereby, in a case that a predetermined condition has been satisfied, the game mode is switched from the basic game mode to the free game mode; (c) a function whereby, in a case that the game mode has been switched to the free game mode, the mini game is executed; (d) a function whereby, each time the mini game is executed, the selection data is received from the first input device, and determination is made based upon the received selection data as to whether the accumulated points are to be updated; (e) a function whereby, in a case that determination has been made that the accumulated points are to be updated, the points that correspond to the received selection data are added to the accumulated points, thereby updating the accumulated points; (f) a function whereby, after the mini game has been executed a predetermined number of times, in a case that the updated accumulated points are at least equal to the number of points that correspond to the number of instances of determination that the player has won extra free games, the number of extra free games is determined according to the updated accumulated points; (g) a function of incrementing by a predetermined number the number of instances of determination that the player has won extra free games; and (h) a function of executing the extra free game the determined number of times.

The gaming machine according to the third aspect of the present invention provides: (a) a function whereby, upon receipt of the signal from the second input device, the basic game is started; (b) a function whereby, in a case that a predetermined condition has been satisfied, the game mode is switched from the basic game mode to the free game mode; (c) a function whereby, in a case that the game mode has been switched to the free game mode, the mini game is executed; (d) a function whereby, each time the mini game is executed, the selection data is received from the first input device, and determination is made based upon the received selection data as to whether the accumulated points are to be updated; (e) a function whereby, in a case that determination has been made that the accumulated points are to be updated, the points that correspond to the received selection data are added to the accumulated points, thereby updating the accumulated points; (f) a function whereby, after the mini game has been executed a predetermined number of times, in a case that the updated accumulated points are at least equal to the number of points that correspond to the number of instances of determination that the player has won extra free games, the number of extra free games is determined according to the updated accumulated points; (g) a function of incrementing by a predetermined number the number of instances of determination that the player has won extra free games; and (h) a function of executing the extra free game the determined number of times.

A fourth aspect of the present invention relates to a gaming machine having the following configuration. The gaming machine includes: memory which stores accumulated points that are updated according to the results of a mini game; a display which displays multiple selection regions; a first input device which outputs the selection data associated with the selection region selected by a player from among the multiple selection regions displayed on the display; a second input device which outputs a signal that starts a basic game; and a controller which provides: (a) a function whereby, upon receipt of the signal from the second input device, the basic game is started; (b) a function whereby, in a case that a predetermined condition has been satisfied, the game mode is switched from the basic game mode to the free game mode; (c) a function whereby, in a case that the game mode has been switched to the free game mode, the mini game is executed each time the free game is executed; (d) a function whereby, each time the mini game is executed, the selection data is received from the first input device, and determination is made based upon the received selection data as to whether the accumulated points are to be updated; (e) a function whereby, in a case that determination has been made that the accumulated points are to be updated, the points that correspond to the received selection data are added to the accumulated points, thereby updating the accumulated points; (f) a function whereby, after the mini game has been executed a predetermined number of times, the number of extra free games is determined according to the updated accumulated points; and (g) a function of executing the extra free game the determined number of times.

The gaming machine according to the fourth aspect of the present invention provides: (a) a function whereby, upon receipt of the signal from the second input device, the basic game is started; (b) a function whereby, in a case that a predetermined condition has been satisfied, the game mode is switched from the basic game mode to the free game mode; (c) a function whereby, in a case that the game mode has been switched to the free game mode, the mini game is executed each time the free game is executed; (d) a function whereby, each time the mini game is executed, the selection data is received from the first input device, and determination is made based upon the received selection data as to whether the accumulated points are to be updated; (e) a function whereby, in a case that determination has been made that the accumulated points are to be updated, the points that correspond to the received selection data are added to the accumulated points, thereby updating the accumulated points; (f) a function whereby, after the mini game has been executed a predetermined number of times, the number of extra free games is determined according to the updated accumulated points; and (g) a function of executing the extra free game the determined number of times.

A fifth aspect of the present invention relates to a gaming machine having the following configuration. The gaming machine includes: memory which stores accumulated points that are updated according to the results of a mini game; a display which displays multiple selection regions; a first input device which outputs the selection data associated with the selection region selected by a player from among the multiple selection regions displayed on the display; a second input device which outputs a signal that starts a basic game; and a controller which provides functions including: (a) a function whereby, upon receipt of the signal from the second input device, the basic game is started; (b) a function whereby, in a case that a predetermined condition has been satisfied, the game mode is switched from the basic game mode to the free game mode; (c) a function whereby, in a case that the game mode has been switched to the free game mode, the mini game is executed each time the free game is executed; (d) a function whereby, each time the mini game is executed, the selection data is received from the first input device, and determination is made based upon the received selection data as to whether the accumulated points are to be updated; (e) a function whereby, in a case that determination has been made that the accumulated points are to be updated, the points that correspond to the received selection data are added to the accumulated points, thereby updating the accumulated points; (f) a function whereby, in a case that the updated accumulated points are at least equal to a predetermined number of points after the mini game has been executed a predetermined number of times, the number of extra free games is determined according to the updated accumulated points; and (g) a function of executing the extra free game the determined number of times.

The gaming machine according to the fifth aspect of the present invention provides: (a) a function whereby, upon receipt of the signal from the second input device, the basic game is started; (b) a function whereby, in a case that a predetermined condition has been satisfied, the game mode is switched from the basic game mode to the free game mode; (c) a function whereby, in a case that the game mode has been switched to the free game mode, the mini game is executed each time the free game is executed; (d) a function whereby, each time the mini game is executed, the selection data is received from the first input device, and determination is made based upon the received selection data as to whether the accumulated points are to be updated; (e) a function whereby, in a case that determination has been made that the accumulated points are to be updated, the points that correspond to the received selection data are added to the accumulated points, thereby updating the accumulated points; (f) a function whereby, in a case that the updated accumulated points are at least equal to a predetermined number of points after the mini game has been executed a predetermined number of times, the number of extra free games is determined according to the updated accumulated points; and (g) a function of executing the extra free game the determined number of times.

A sixth aspect of the present invention relates to a gaming machine having the following configuration. The gaming machine includes: memory which stores accumulated points that are updated according to the results of a mini game; a display which displays multiple selection regions; a first input device which outputs the selection data associated with the selection region selected by a player from among the multiple selection regions displayed on the display; a counter which stores the number of instances of determination that the player has won extra free games; a second input device which outputs a signal that starts a basic game; and a controller which provides: (a) a function whereby, upon receipt of the signal from the second input device, the basic game is started; (b) a function whereby, in a case that a predetermined condition has been satisfied, the game mode is switched from the basic game mode to the free game mode; (c) a function whereby, in a case that the game mode has been switched to the free game mode, the mini game is executed each time the free game is executed; (d) a function whereby, each time the mini game is executed, the selection data is received from the first input device, and determination is made based upon the received selection data as to whether the accumulated points are to be updated; (e) a function whereby, in a case that determination has been made that the accumulated points are to be updated, the points that correspond to the received selection data are added to the accumulated points, thereby updating the accumulated points; (f) a function whereby, after the mini game has been executed a predetermined number of times, in a case that the updated accumulated points are at least equal to the number of points that correspond to the number of instances of determination that the player has won extra free games, the number of extra free games is determined according to the updated accumulated points; (g) a function of incrementing by a predetermined number the number of instances of determination that the player has won extra free games; and (h) a function of executing the extra free game the determined number of times.

The gaming machine according to the sixth aspect of the present invention provides: (a) a function whereby, upon receipt of the signal from the second input device, the basic game is started; (b) a function whereby, in a case that a predetermined condition has been satisfied, the game mode is switched from the basic game mode to the free game mode; (c) a function whereby, in a case that the game mode has been switched to the free game mode, the mini game is executed each time the free game is executed; (d) a function whereby, each time the mini game is executed, the selection data is received from the first input device, and determination is made based upon the received selection data as to whether the accumulated points are to be updated; (e) a function whereby, in a case that determination has been made that the accumulated points are to be updated, the points that correspond to the received selection data are added to the accumulated points, thereby updating the accumulated points; (f) a function whereby, after the mini game has been executed a predetermined number of times, in a case that the updated accumulated points are at least equal to the number of points that correspond to the number of instances of determination that the player has won extra free games, the number of extra free games is determined according to the updated accumulated points; (g) a function of incrementing by a predetermined number the number of instances of determination that the player has won extra free games; and (h) a function of executing the extra free game the determined number of times.

BRIEF DESCRIPTION OF THE DRAWINGS

FIG. 7 is a diagram which shows a symbol disposition table according to the embodiment of the present invention;

FIG. 11 is a diagram which shows a basic game random number table according to the embodiment of the present invention;

FIG. 12 is a diagram which shows a free game random number table according to the embodiment of the present invention;

FIG. 13 is a diagram which shows a win/lose determination table according to the embodiment of the present invention;

FIG. 14 is a diagram which shows a point addition determination random number table according to the embodiment of the present invention;

FIG. 15 is a diagram which shows a clear point calculation ratio table according to the embodiment of the present invention;

FIG. 16 is a diagram which shows an extra free games table according to the embodiment of the present invention;

DETAILED DESCRIPTION OF THE INVENTION

Description will be made regarding an embodiment of the present invention with reference to the drawings.

A gaming machine 13 according to the present invention includes: RAM 110 which stores the accumulated points that are updated according to the results of a mini game; a liquid crystal display 30 which displays multiple selection regions; a touch panel 32 which outputs the selection data associated with the specific selection region selected by a player from among the multiple selection regions displayed on the liquid crystal display 30; and a start switch 25 which outputs a signal that starts a basic game. With such an arrangement, the CPU 106 provides functions including: a function whereby, upon receipt of a signal from the start switch 25, the basic game is started; a function whereby, in a case that a predetermined condition has been satisfied, the basic game mode is switched to the free game mode; a function whereby, in a case that the game mode has been switched to the free game mode, a mini game is executed; a function whereby selection data is received from the touch panel 32 each time the mini game is executed; a function whereby determination is made based upon the selection data thus received as to whether the accumulated points are to be updated; a function whereby, in a case that determination has been made that the accumulated points are to be updated, the points that correspond to the selection data thus received are added to the accumulated points, thereby updating the accumulated points; a function whereby, after the mini game has been executed a predetermined number of times, the number of extra free games is determined based upon the accumulated points thus updated.; and a function whereby the extra free game is executed the number of times thus determined.

Figure 1:
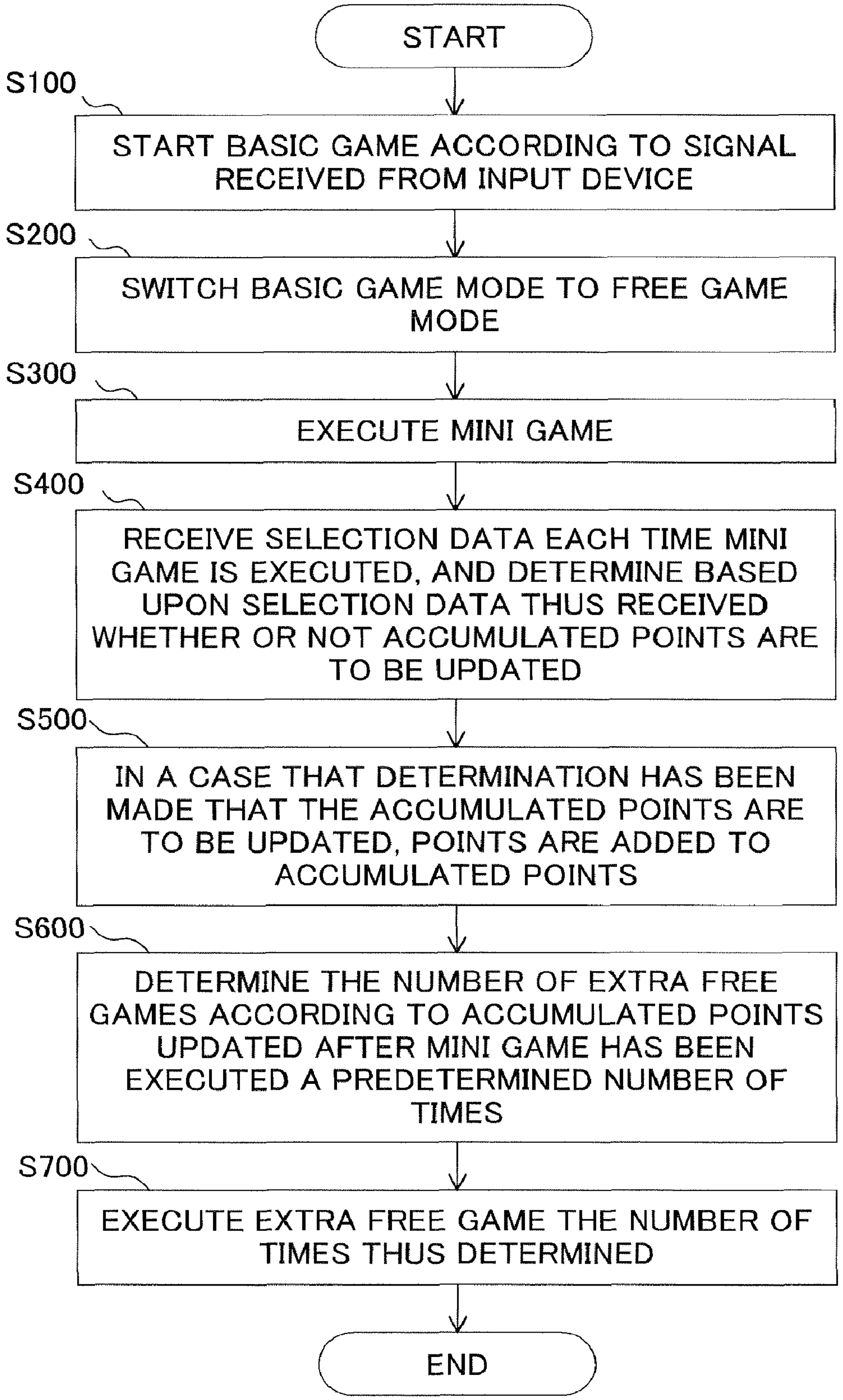
FIG. 1 is a flowchart which shows a flow of a game executed by a gaming machine according to an embodiment of the present invention.

Although detailed description thereof will be made later, a summary description thereof will be made below with reference to FIG. 1. That is to say, upon receipt of a signal from the start switch 25, the CPU 106 starts the basic game (Step S100). In a case that a predetermined condition has been satisfied, the basic game mode is switched to the free game mode (step S200). In a case that the game mode has been switched to the free game mode, the CPU 106 executes the mini game (Step S300). Then, the CPU 106 receives selection data from the touch panel 32 each time the mini game is executed, and determination is made based upon the selection data thus received as to whether the accumulated points are to be updated (Step S400). In a case that determination has been made that the accumulated points are to be updated, the points that correspond to the selection data thus received are added to the accumulated points, thereby updating the accumulated points (Step S500). After the mini game has been executed a predetermined number of times, the number of extra free games is determined based upon the accumulated points thus updated (Step S600). Subsequently, the CPU 106 executes the extra free games the number of times thus determined (Step S700).

Figure 2:
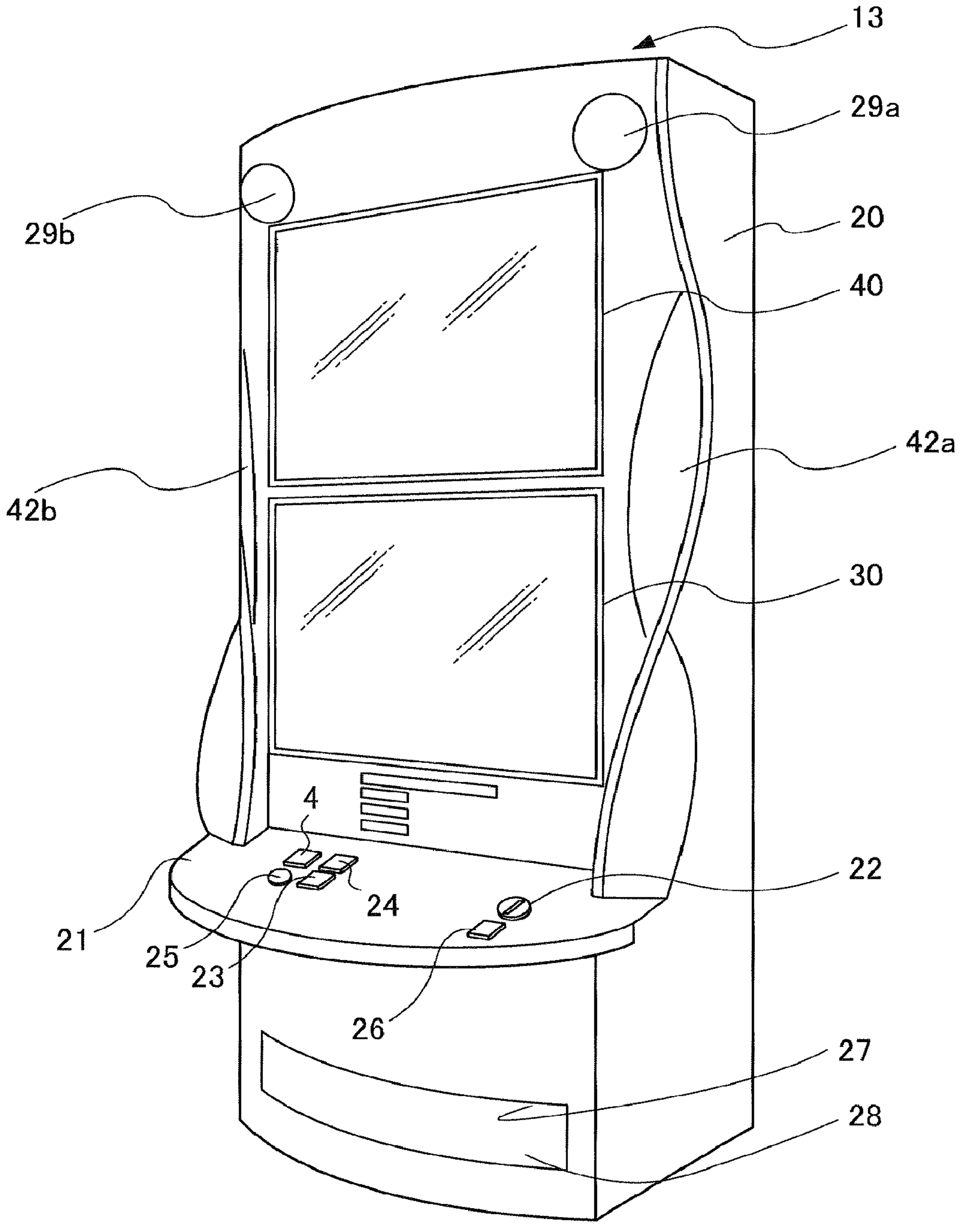
FIG. 2 is an external perspective view of the gaming machine according to the embodiment of the present invention.

FIG. 2 is a perspective view of the gaming machine 13 according to an embodiment of the present invention. The gaming machine 13 includes a cabinet 20. The cabinet 20 has a structure in which the face facing the player is open. The cabinet 20 includes various kinds of components. Such components include: a game controller 100 (see FIG. 4) for electrically controlling the gaming machine 13; a hopper 44 (FIG. 4) for controlling the insertion of coins (gaming medium) and for retaining and paying out the coins; etc. The gaming medium is not restricted to coins. Also, examples of such gaming media include medals, tokens, electronic money or electronic value information (credit) having the same value.

Furthermore, a liquid crystal display 30 is provided at approximately the central portion of the front face of the cabinet 20. Also, another liquid crystal display 40 is provided above the liquid crystal display 30.

The liquid crystal display 30 is provided as a display device for displaying various kinds of images with respect to the game such as images for providing visual effects. Such an arrangement allows the player to advance the game while observing various kinds of images displayed on the aforementioned liquid crystal display 30. During such a game, the liquid crystal display 30 displays images for the slot game and the mini game as shown in FIGS. 17 through 21.

The gaming machine 13 includes video reels. With such an arrangement, five virtual reels are displayed on the liquid crystal display 30. Note that the term "video reel" as used here represents a mechanism for displaying a reel on the liquid crystal display 30 in the form of an image, instead of a mechanical reel. Multiple kinds of symbols necessary for the basic game include "BONUS", "WILD", "TREASURE BOX", "GOLDEN MASK", "HOLY CUP", "COMPASS & MAP", "SNAKE", "A", "K", "Q", "J", and "10". With such an arrangement, the liquid crystal display 30 displays these symbols with an image as if the reel has rotated.

The other liquid crystal display 40 provided above the liquid crystal display 30 is provided for displaying sub-images. Examples of such sub-images include an image for describing the game rules, a demonstration image, etc.

Also, sound transmission openings 29*a* and 29*b* are provided on both the left and right sides above the liquid crystal display 40, which allow the sound effects generated by a speaker 41 (see FIG. 4) stored within the cabinet 20 to propagate outside the cabinet 20. The sound effects are generated from the sound transmission openings 29*a* and 29*b* according to the advance of the game. Also, decorative lamps 42*a* and 42*b* are provided on both the left and right sides of approximately the middle part of the gaming machine 13. The illumination of the gaming machine 13 by the decorative lamps 42*a* and 42*b* is controlled so as to correspond to the advance of the game.

The gaming machine 13 includes an approximately horizontal operation unit 21 below the liquid crystal display 30. Furthermore, a coin insertion opening 22, which allows the player to insert coins, is provided on the right side of the operation unit 21. On the other hand, the components provided to the left side of the operation unit 21 include: a BET switch 23 which allows the player to determine which lines are to be set to active pay lines among nine lines L1, L2, L3, L4, L5, L6, L7, L8, and L9, for providing a prize described later (which will simply be referred to as "active pay lines" hereafter), and which allows the player to select the number of coins as gaming media which are to be bet on the aforementioned active pay lines; and a spin repeat bet switch 24 which allows the player to play the game again without changing the number of coins bet on the aforementioned active pay lines from that in the immediately previous game. Such an arrangement allows the player to set the number of coins bet on the aforementioned active pay lines by performing a pushing operation on either the BET switch 23 or the spin repeat bet switch 24.

With the aforementioned operation unit 21, a start switch 25 is provided on the left side of the BET switch 23, which allows the player to input a start operation instruction for the basic game in increments of games. Upon performing a pushing operation on either the start switch 25 or the spin repeat bet switch 24, which serves as a trigger to start the game, the liquid crystal display 30 displays an image of the aforementioned five video reels 3A through 3E which then start to rotate.

On the other hand, a cash out switch 26 is provided near the coin insertion opening 22 on the aforementioned operation unit 21. Upon the player pushing the cash out switch 26, the inserted coins are paid out from a coin payout opening 27 provided at a lower portion of the front face of the cabinet 20. The coins thus paid out are retained in a coin tray 28.

Figure 3:
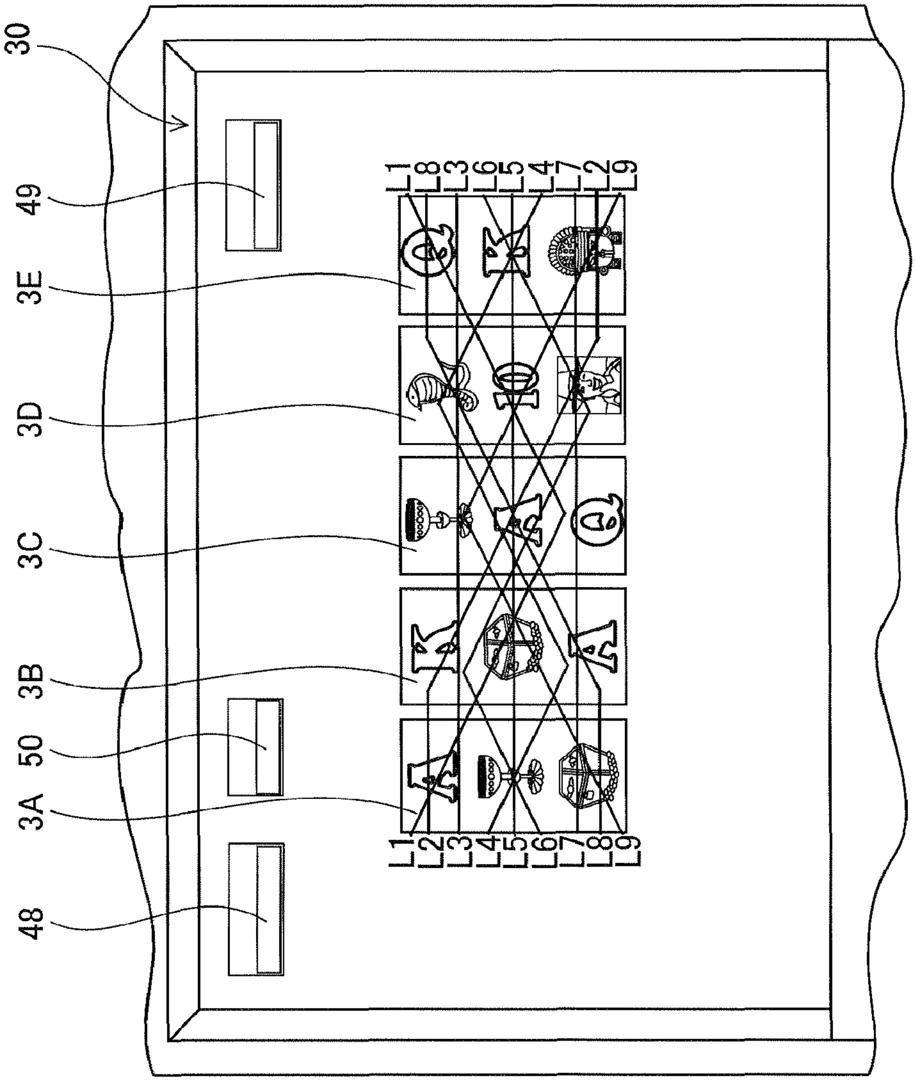
FIG. 3 is an enlarged front view which shows a display region of the gaming machine according to the embodiment of the present invention.

FIG. 3 is an enlarged view which shows the display region of the gaming machine 13. The gaming machine 13 has the nine lines L1 through L9 for providing nine kinds of prizes as shown in FIG. 3. Each of the lines L1 through L9 for providing a corresponding prize is formed such that it extends so as to pass through one of the symbols on each of the video reels 3A through 3E when the rotation of the five video reels 3A through 3E has stopped in the video image.

Upon pushing the aforementioned BET switch 23 once, the line L3 for providing a third prize, the line L5 for providing a fifth prize, and the line L7 for providing a seventh prize, are set to be active pay lines, and one coin is input as a credit medal, for example.

On the other hand, upon pushing the aforementioned BET switch 23 twice, the line L1 for providing a first prize, the line L4 for providing a fourth prize, and the line L8 for providing an eighth prize, are set to be active pay lines, in addition to the aforementioned three lines, and two coins are input as credit medals, for example.

On the other hand, upon pushing the aforementioned BET switch 23 three times, the line L2 for providing a second prize, the line L6 for providing a sixth prize, and the line L9 for providing a ninth prize, are set to be active pay lines, in addition to the aforementioned six lines, and three coins are input as credit medals, for example.

The game available in the present embodiment is a game in which a predetermined set of symbols are made along the active pay lines.

Furthermore, the liquid crystal display 30 displays, on the upper portion thereof, a payout display unit 48, a BET amount display unit 50, and a credit amount display unit 49 in that order from the left side. The payout display unit 48 is a component for displaying the amount of coins paid out when a particular winning combination of the symbols has been displayed along any one the active pay lines for providing a prize. The credit amount display unit 49 is a component for displaying the amount of coins retained in the gaming machine 13 in the form of a credit. The BET amount display unit 50 is a component for displaying the BET amount which is the number of coins bet on the aforementioned active pay lines.

Figure 4:
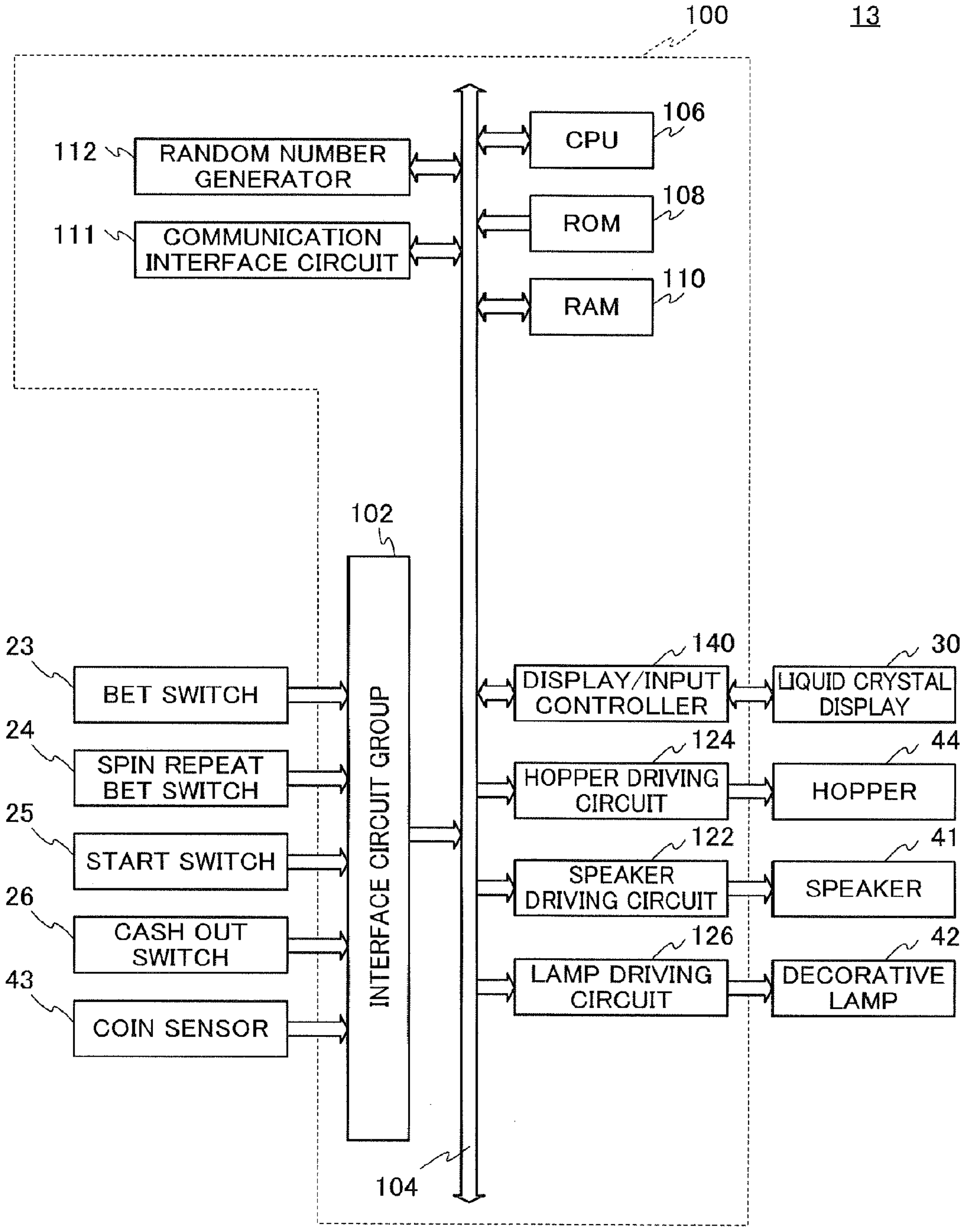
FIG. 4 is a block diagram which shows a controller of the gaming machine according to the embodiment of the present invention.

FIG. 4 is a block diagram which shows an electrical configuration of the game controller 100 of the gaming machine 13. As shown in FIG. 4, the game controller 100 of the gaming machine 13 is a micro computer, and includes an interface circuit group 102, an input/output bus 104, a CPU 106, ROM 108, RAM 110, a communication interface circuit 111, a random number generator 112, a speaker driving circuit 122, a hopper driving circuit 124, a lamp driving circuit 126, and a display/input controller 140.

The interface circuit group 102 is connected to the input/output bus 104. The input/output bus 104 performs input/output of data signals or address signals to/from the CPU 106.

Furthermore, the start switch 25 is connected to the interface circuit group 102. The start signal output from the start switch 25 is converted into a predetermined signal by the interface circuit group 102, and the input signal thus converted is supplied to the input/output bus 104.

Furthermore, the BET switch 23, the spin repeat bet switch 24, and the cash out switch 26 are connected to the interface circuit group 102. Each of the switching signals output from these switches 23, 24, and 26 is also supplied to the interface circuit group 102, and is converted into a predetermined signal by the interface circuit group 102. The switching signals thus converted are supplied to the input/output bus 104.

Furthermore, a coin sensor 43 is connected to the interface circuit group 102. The coin sensor 43 is a sensor for detecting the coins inserted into the coin insertion opening 22. The coin sensor 43 is provided in combination with the coin insertion opening 22. The sensing signal output from the coin sensor 43 is also supplied to the interface circuit group 102, and is converted into a predetermined signal by the interface circuit group 102. The sensing signal thus converted is supplied to the input/output bus 104.

The ROM 108 and the RAM 110 are connected to the input/output bus 104.

Upon receipt of the game start operation instruction input through the start switch 25, the CPU 106 reads out a game program, and executes the game. The game program has been programmed so as to instruct the CPU 106 to perform the following operation. That is to say, according to the game program, the CPU 106, via the display/input controller 140, displays on the liquid crystal display 30 an image of the five video reels commencing to scroll the symbols that are disposed on the five video reels. Then., the CPU 106 displays an image of the five video reels stopping such that the combination of the symbols on these five video reels is rearranged, whereupon a new combination of the symbols is made along the active pay lines. In a case that a particular winning combination of the symbols when they are stationary has been made along any one of the active pay lines, the CPU 106 pays out a predetermined amount of coins corresponding to the particular winning combination.

Figure 8:
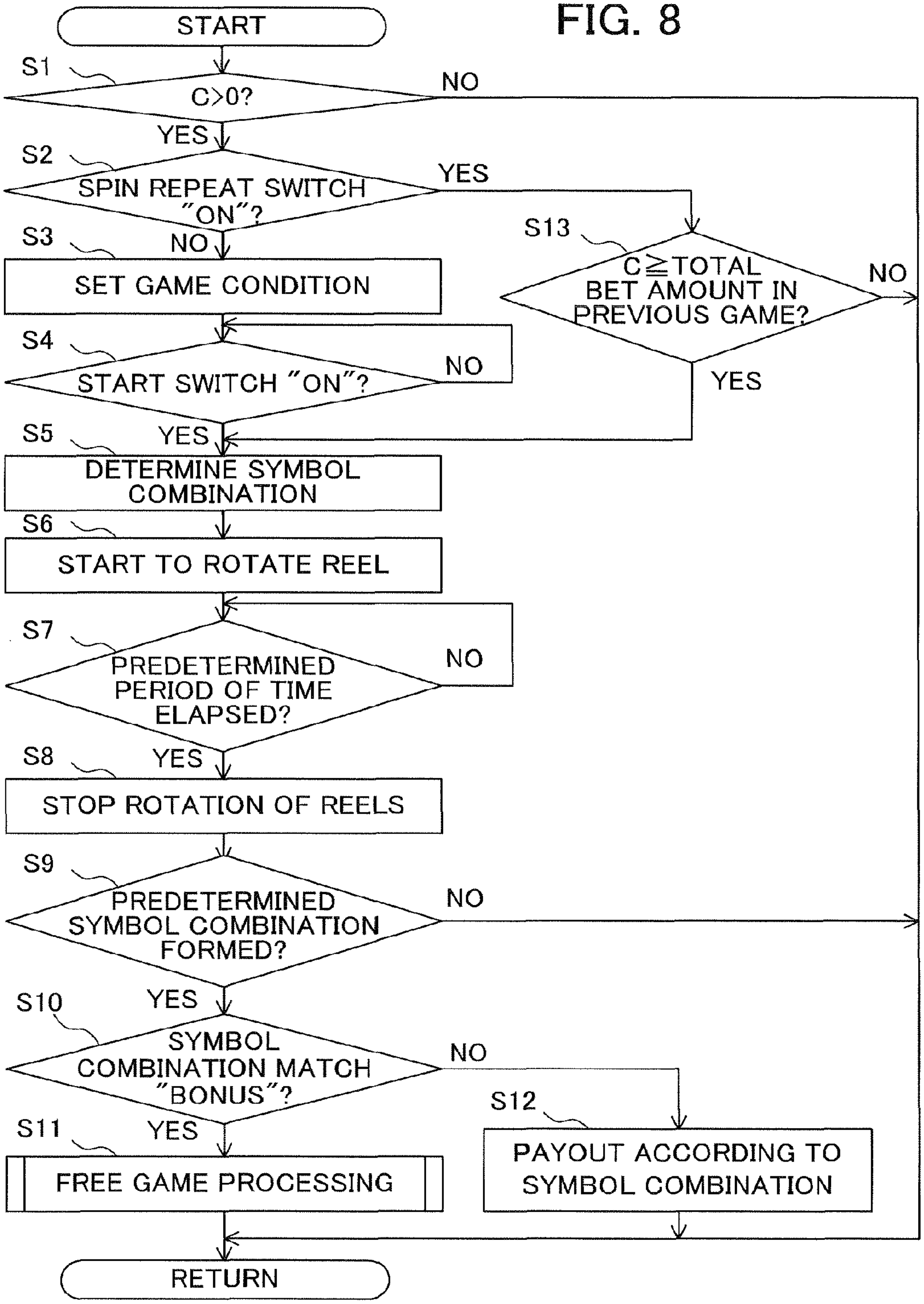
FIG. 8 is a flowchart for basic game processing executed by the gaming machine according to the embodiment of the present invention.

The ROM 108 stores: a control program for central control of the gaming machine 13; a program for executing routines shown in FIG. 8 through FIG. 10 (which will be referred to as the "routine execution program" hereafter); initial data for executing the control program; and various data tables used for determination processing. Note that the routine execution program includes the aforementioned game program etc. On the other hand, examples of the data tables include tables such as those shown in FIG. 11 through FIG. 16. The RAM 110 temporarily stores flags, variables, etc., used for the aforementioned control program.

Furthermore, a communication interface circuit 111 is connected to the input/output bus 104. The communication interface circuit 111 is a circuit for communicating with a central controller 11 etc., via the network 12 including various kinds of networks such as a LAN.

Furthermore, the random number generator 112 for generating a random number is connected to the input/output bus 104. The random number generator 112 generates a random number in a predetermined range, e.g., a range between 0 and 65,535 ($2^{16}-1$). Alternatively, an arrangement may be made in which the CPU 106 generates a random number by computation.

Furthermore, the speaker driving circuit 122 for driving the speaker 41 is connected to the input/output bus 104. The CPU 106 reads out the sound data stored in the ROM 108, and transmits the sound data thus read out to the speaker driving circuit 122 via the input/output bus 104, thereby providing predetermined sound effects generated by the speaker 41.

Furthermore, the hopper driving circuit 124 for driving the hopper 44 is connected to the input/output bus 104. Upon receipt of a cash out signal input from the cash out switch 26, the CPU 106 transmits a driving signal to the hopper driving circuit 124 via the input/output bus 104. As a result, the hopper 44 pays out an amount of coins corresponding to the credit remaining at the current point in time, as stored in a predetermined memory area of the RAM 110.

Also, instead of the payment of real coins, an arrangement may be made in which the credit data is stored in a data card or the like in the coin payment step. That is to say, with such an arrangement, the player has his/her own card which serves as a storage medium. Upon the player inserting this card into the gaming machine 13, the data with respect to the credit is stored in the card.

Also, a lamp driving circuit 126 is connected to the input/output bus 104 for driving the decorative lamps 42*a* and 42*b*. Under predetermined conditions according to a program stored in the ROM 108, the CPU 106 transmits a signal for driving these lamps, thereby causing the decorative lamps 42*a* and 42*b* to blink.

Furthermore, the display/input controller 140 is connected to the input/output bus 104. The CPU 106 creates an image display command corresponding to the state and results of the game, and outputs the image display command thus created to the display/input controller 140 via the input/output bus 104. Upon receipt of the image display command input from the CPU 106, the display/input controller 140 creates a driving signal for driving the liquid crystal display 30 according to the image display command thus input, and outputs the driving signal thus created to the liquid crystal display 30. As a result, a predetermined image is displayed on the liquid crystal display 30. In addition, the display/input controller 140 transmits the signal input through the touch panel 32 provided on the liquid crystal display 30 to the CPU 106 via the input/output bus 104 in the form of an input signal. Note that the image display commands include commands with respect to the payout amount display unit 48, commands with respect to the credit amount display unit 49, and commands with respect to the BET amount display unit 50.

Figure 5:
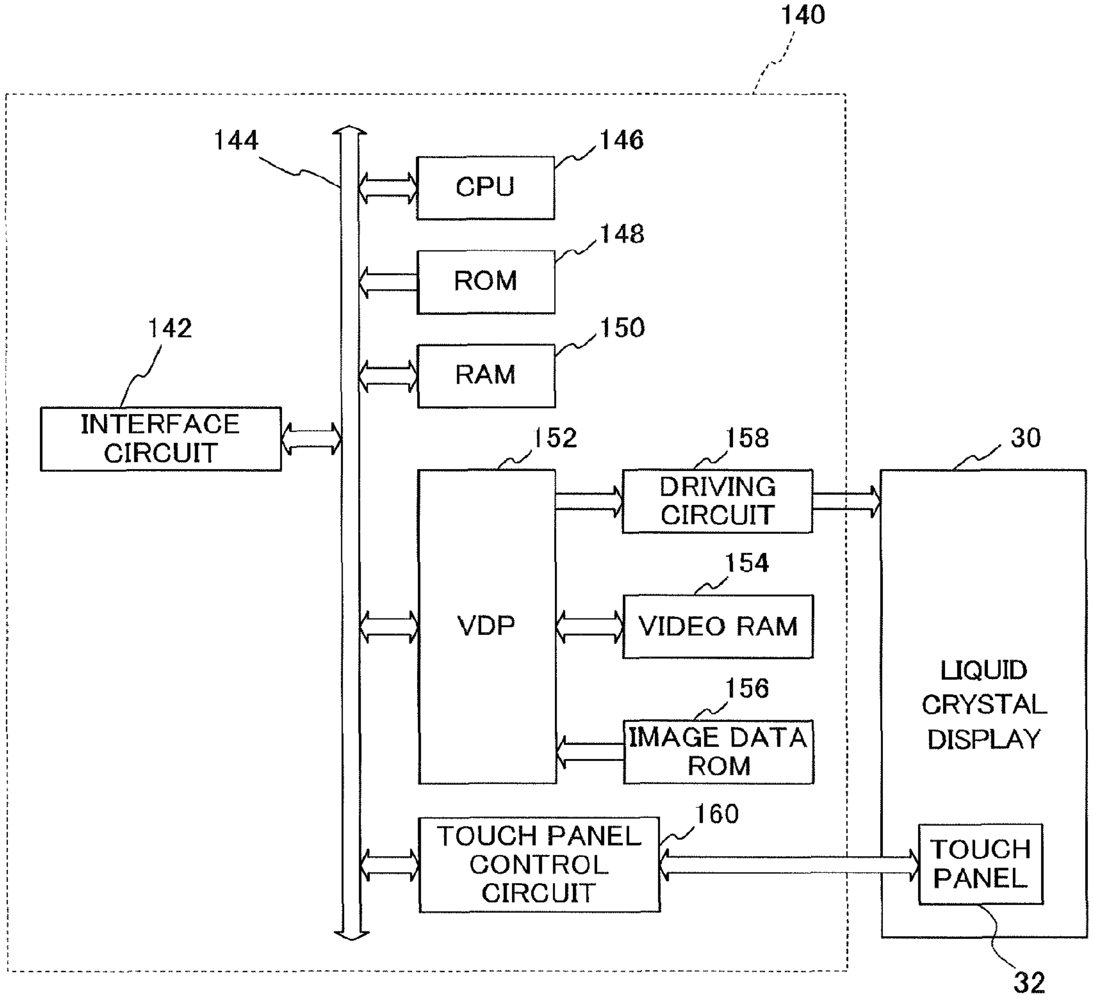
FIG. 5 is a block diagram which shows a display/input controller of the gaming machine according to the embodiment of the present invention.

FIG. 5 is a block diagram which shows an electrical configuration of the display/input controller 140 of the gaming machine 13. The display/input controller 140 of the gaming machine 13 is a sub-microcomputer for performing image display processing and input control for the touch panel 32. The display/input controller 140 includes an interface circuit 142, an input/output bus 144, a CPU 146, ROM 148, RAM 150, a VDP 152, video RAM 154, image data ROM 156, a driving circuit 158, and a touch panel control circuit 160.

The interface circuit 142 is connected to the input/output bus 144. The image display command output from the CPU 106 of the aforementioned game controller 100 is supplied to the input/output bus 144 via the interface circuit 142. The input/output bus 144 performs input/output of data signals or address signals to/from the CPU 146.

Furthermore, the ROM 148 and the RAM 150 are connected to the input/output bus 144. The ROM 148 stores a display control program for generating a driving signal, which is to be supplied to the liquid crystal display 30, according to an image display command received from the CPU 106 of the aforementioned game controller 100. On the other hand, the RAM 150 stores flags and variables used in the aforementioned display control program.

Furthermore, the VDP 152 is connected to the input/output bus 144. The VDP 152 includes a so-called sprite circuit, a screen circuit, a palette circuit, etc., and can perform various kinds of processing for displaying images on the liquid crystal display 30. With such an arrangement, the components connected to the VDP 152 include: the video RAM 154 for storing image data according to the image display command received from the CPU 106 of the aforementioned game controller 100; and the image data ROM 156 for storing various kinds of image data including the aforementioned image data for visual effects etc. Furthermore, the driving circuit 158 for outputting a driving signal for driving the liquid crystal display 30 is connected to the VDP 152.

The aforementioned CPU 146 instructs the video RAM 154 to store the image data which is to be displayed on the liquid crystal display 30 according to the image display command received from the CPU 106 of the aforementioned game controller 100 by reading out the display control program stored in the ROM 148 and by executing the program thus read out. Examples of the image display commands include various kinds of image display commands including the aforementioned image display commands for visual effects and the like.

The image data ROM 156 stores various kinds of image data including the aforementioned image data for visual effects and the like.

The touch panel control circuit 160 transmits to the CPU 106 the signals input via the touch panel 32, provided on the liquid crystal display 30, via the input/output bus 144 in the form of an input signal.

Figure 6:
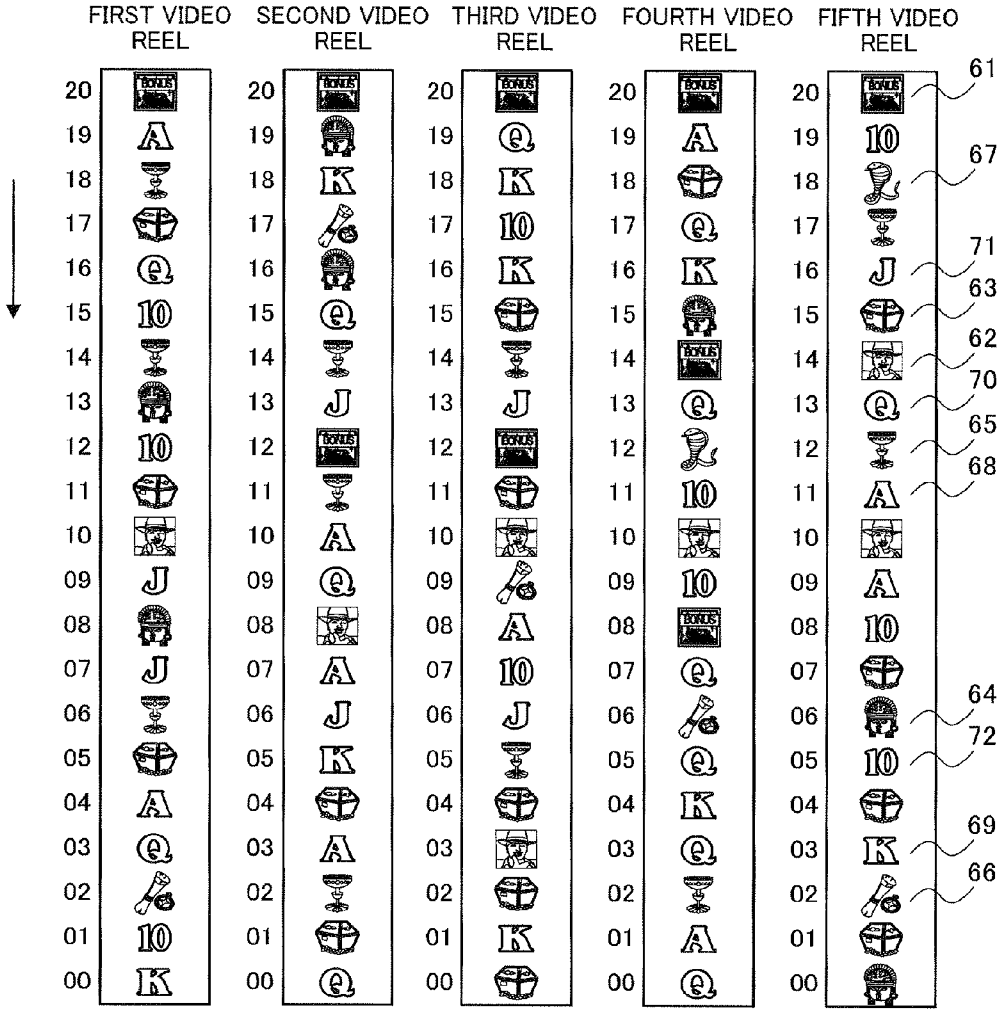
FIG. 6 is a diagram which shows symbol sequences each of which is displayed on the corresponding video reel of the gaming machine according to the embodiment of the present invention.

FIG. 6 shows symbol sequences which are depicted on the respective video reels 3A through 3E, and along each of which are disposed a sequence of 21 symbols. Note that the symbol sequence for the first video reel corresponds to the video reel 3A. The symbol sequence for the second video reel corresponds to the video reel 3B. The symbol sequence for the third video reel corresponds to the video reel 3C. The symbol sequence for the fourth video reel corresponds to the video reel 3D. The symbol sequence for the fifth video reel corresponds to the video reel 3E.

As shown in FIG. 6, the code numbers "00" through "20" are assigned to the respective symbols of the symbol sequences for the video reels 3A through 3E. The code numbers are stored (recorded) in the aforementioned ROM 108 (FIG. 4) in the form of a data table.

A symbol sequence is depicted on each of the video reels 3A through 3E. Each symbol sequence includes: a "BONUS" symbol (symbol 61) (which will simply be referred to as "BONUS" hereafter); a "WILD" symbol (symbol 62) (which will simply be referred to as "WILD" hereafter); a "TREASURE BOX" symbol (symbol 63) (which will simply be referred to as "TREASURE BOX" hereafter); a "GOLDEN MASK" symbol (symbol 64) (which will simply be referred to as "GOLDEN MASK" hereafter); a "HOLY CUP" symbol (symbol 65) (which will simply be referred to as "HOLY CUP" hereafter); a "COMPASS & MAP" symbol (symbol 66) (which will simply be referred to as "COMPASS & MAP" hereafter); a "SNAKE" symbol (symbol 67) (which will simply be referred to as "SNAKE" hereafter); an "A" symbol (symbol 68) (which will simply be referred to as "A" hereafter); a "K" symbol (symbol 69) (which will simply be referred to as "K" hereafter); a "Q" symbol (symbol 70) (which will simply be referred to as "Q" hereafter); a "J" symbol (symbol 71) (which will simply be referred to as "J" hereafter); and a "10" symbol (symbol 72) (which will simply be referred to as "10" hereafter). Each of the symbol sequences on the video reels 3A through 35 is moved by displaying a video image in which the corresponding video reels 3A through 3E are rotated in the forward direction.

With the present embodiment, the types of prizes prepared include a "BONUS" prize, a "WILD" prize, a "SNAKE" prize, a "TREASURE BOX" prize, a "GOLDEN MASK" prize, a "HOLY CUP" prize, a "COMPASS & MAP" prize, an "A" prize, a "K" prize, a "Q" prize, a "J" prize, and a "10" prize. The prize type information (prize type data) is control information that basically indicates each combination of symbols that provides a profit to the player in association with the prize (the number of coins to be paid out). Also, the prize type information is the control information which is used for a stop control operation for each of the video reels 3A through 3E, switching (transition) operation for the game state, a coin awarding operation, etc.

FIG. 7 shows a symbol disposition table. With the symbol disposition table, each code number that indicates the positions of the symbols that make up the aforementioned symbol sequences is registered in association with the corresponding symbols on the video reels 3A through 3E. Note that the first through fifth video reels correspond to the video reels 3A through 3E, respectively. In other words, the symbol disposition table provides the symbol information with respect to the symbol positions (code numbers) on the video reels 3A through 3E.

In FIG. 7, the aforementioned prize types "TREASURE BOX", "GOLDEN MASK", and "COMPASS & MAP" are abbreviated to "TREASURE", "MASK", and "COMPASS", respectively.

FIG. 8 is a flowcharts which shows a flow of the processing operation for the basic game of the gaming machine 13, which is executed by the game controller 100 of the gaming machine 13. The one routine shown in FIG. 8 corresponds to one unit of the game.

Furthermore, let us say that the gaming machine 13 is started up beforehand. Also, let us say that the variables used in the CPU 106 included in the game controller 100 have been initialized to predetermined values, thereby providing the normal operation of the gaming machine 13.

First, the CPU 106 included in the aforementioned game controller 100 determines whether or not any credit remains, which corresponds to the remaining amount of coins inserted by the player (Step S1). Specifically, the CPU 106 reads out the credit amount C stored in the RAM 110, and performs the processing based upon the credit amount C thus read out. In a case that the credit amount C is "0" (in a case of "NO" in the determination processing denoted by Step S1), the CPU 106 is not permitted to start the game. Accordingly, in this case, the CPU 106 ends this routine without involving any processing. On the other hand, in a case that the credit amount C is "1" or more (in a case of "YES" in the determination processing denoted by Step S1), the CPU 106 determines that there is remaining credit, and accordingly, the flow proceeds to Step S2 according to the instruction from the CPU 106. In the following Step S2, the CPU 106 determines whether or not a pushing operation is performed on the spin repeat bet switch 24. In a case that the spin repeat bet switch. 24 has been pushed, and accordingly, in a case of reception of an operation signal via the spin repeat switch 24 (in a case of "YES" in the determination processing denoted by Step S2), the CPU 106 switches the processing to Step S13. On the other hand, in a case of reception of no operation signal via the spin repeat switch 24 during a predetermined period of time (in a case of "NO" in the determination processing denoted by Step S2), the CPU 106 determines that the spin repeat bet switch 24 has not been pushed, and accordingly, the flow proceeds to Step S3 according to the instruction from the CPU 106.

In the following Step S3, the CPU 106 sets the game condition. Specifically, the CPU 106 determines the number of coins to be bet on the active pay lines set in the current game according to the user's operation via the BET switch 23. In this stage, the CPU 106 receives an operation signal generated by the user's operation performed via the BET switch 23. The CPU 106 determines the BET amount bet on each active pay line based upon the number of instances of reception of the BET switch operation signal, and stores the BET amounts thus determined in a predetermined memory region in the RAM 110. The CPU 106 reads out the credit amount C written to a predetermined memory region in the RAM 110. Then, the CPU 106 subtracts the total BET amount, which is the sum total of the BET amounts, from the credit amount C thus readout, and stores the value thus subtracted in a predetermined memory region in the RAM 110. Subsequently, the flow proceeds to Step S4 according to the instruction from the CPU 106.

In the following Step S4, the CPU 106 determines whether or not the start switch 25 is in the ON state, i.e., the CPU 106 stands by until the player operates the start switch 25. Upon the player operating the start switch 25, and accordingly, upon receipt of an operation signal via the start switch 25 (in a case of "YES" in the determination processing denoted by Step S4), the CPU 106 determines that the start switch 25 has been operated, and accordingly, the CPU 106 switches the processing to Step S5.

On the other hand, in a case that the flow has proceeded to Step S13, the CPU 106 determines whether or not the credit amount C is equal to or greater than the total bet amount bet on the previous game. In other words, the CPU 106 determines whether or not the player can start the game by pushing the spin repeat bet switch 24. Specifically, in a case that the spin repeat bet switch 24 has been pushed, and accordingly, in a case that the operation signal has been input from the aforementioned switch 24, the CPU 106 reads out the credit amount C and the BET amount bet on each of the active pay lines L1 to L9 in the previous game stored in the predetermined memory areas of the aforementioned RAM 110. Then, the CPU 106 determines whether or not the aforementioned credit amount C is equal to or greater than the total bet amount bet in the previous game based upon the relation between the credit amount C and the BET amounts thus read out. The CPU 106 performs processing based upon the determination results. In a case that determination has been made that the aforementioned credit amount C is less than the total bet amount bet on the previous game (in a case of "NO" in the processing in Step S13), the CPU 106 cannot start the game, and accordingly, the CPU 106 ends this routine without performing any processing. On the other hand, in a case that determination has been made that the aforementioned credit amount C is equal to or greater than the total bet amount bet in the previous game (in a case of "YES" in the processing in Step S13), the CPU 106 subtracts the total bet amount bet in the previous game from the aforementioned credit amount C, and stores the subtracted value in a predetermined area of the RAM 110. Subsequently, the flow proceeds to Step S5 according to the instruction from the CPU 106.

In the following Step S5, the CPU 106 performs combination determination processing. Specific description will be made below regarding the combination determination processing.

In the aforementioned combination determination processing, first, the CPU 106 determines the combinations of the symbols when they are stationary along the aforementioned active pay lines. Specifically, the CPU 106 issues a command for the random number generator 112 to generate a random number, thereby extracting a random number in a predetermined range (in a range of "0" to "65535" in the present embodiment) generated by the random number generator 112. The CPU 106 stores the random number thus extracted in a predetermined memory area of the RAM 110. Note that description is being made in the present embodiment regarding an arrangement in which the random number is generated by the random number generator 112, which is a separate component from the aforementioned CPU 106. Also, an arrangement may be made in which the random number is generated by computation processing by the CPU 106 without involving the random number generator 112. The CPU 106 reads out a random number table and a particular winning combination table (random number table for a basic game (see FIG. 11)), each of which is stored in the ROM 108. Then, the CPU 106 stores, in a predetermined memory area of the RAM 110, the random number table and the particular winning combination thus read out. Note that the CPU 106 controls display of the video reels when they are stationary for each reel based upon the aforementioned random number table. Furthermore, the CPU 106 reads out the random number table and the particular winning combination table stored in the predetermined area of the aforementioned RAM 110. Then, the CPU 106 determines the combination of the symbols when they are stationary with respect to the aforementioned active pay lines with reference to the aforementioned random number table using the random number stored in the predetermined memory region of the aforementioned RAM 110 as a parameter. Upon determination of particular winning combinations, the CPU 106 stores the particular winning combination data thus determined in a predetermined memory area of the RAM 110. Then, the CPU 106 reads out the random number and the particular winning combination data stored in the predetermined memory area of the RAM 110, and determines the combination to be displayed of the symbols when they are stationary based upon the random number and the particular winning combination data thus read out. In this stage, a symbol disposition table stored in the ROM 108 is read out by the CPU 106. The symbol disposition table thus read out is stored in a predetermined memory area of the RAM 110, and is used as reference data. The CPU 106 stores the data for the stationary symbols thus determined in a predetermined memory area of the RAM 110. Alternatively, an arrangement may be made in which the symbols when they are stationary are determined for each reel using the aforementioned random number table.

Upon determination of the combination of the symbols when they are stationary with respect to the aforementioned active pay lines, the CPU 106 determines whether or not the combination of the symbols when they are stationary with respect to the active pay lines matches any one of the particular winning combinations. In a case that the combination of the symbols when they are stationary with respect to the active pay lines matches any one of the particular winning combinations, the CPU 106 activates a flag, which indicates that the player has won the prize that corresponds to the kind of particular winning combination, in order to provide the prize that accords with the particular winning combination of symbols with respect to the active pay lines thus determined as described above. The activated flag, which indicates the player has won a prize, is stored in a predetermined area of the RAM 110 according to the instruction from the CPU 106. On the other hand, in a case that the combination of the symbols when they are stationary with respect to the active pay lines matches any one of the other combinations, i.e., the losing combinations, the CPU 106 does not activate the flag which indicates that the player has won a prize. Subsequently, the flow proceeds to Step S6 according to the instruction from the CPU 106.

In the following Step S6, the CPU 106 displays an image of the five video reels 3A through 3E starting to rotate. Specifically, the CPU 106 displays an image of the video reels 3A through E3 starting to rotate in a predetermined order or at the same time according to the symbol disposition table stored in the aforementioned RAM 110.

Upon beginning to display a video image of the video reels 3A through 3E starting to rotate, the CPU 106 waits for a predetermined period of time to elapse (Step S7). After the predetermined period of time has elapsed (in a case of "YES" in the determination processing in Step S7), the CPU 106 instructs the video reels 3A through 3E to automatically stop rotating (Step S8). Specifically, the CPU 106 displays an image of the video reels 3A through 3E stopping to rotate in a predetermined order or at the same time such that the symbols when they are stationary, which correspond to a particular winning combination as determined in the aforementioned Step S5, is displayed in a display region that can be observed by the player. Subsequently, the flow proceeds to Step S9 according to the instruction from the CPU 106.

In the following Step S9, the CPU 106 determines whether or not a predetermined symbol combination has been formed based upon the results of the combination determination processing performed in Step S5. Specifically, the CPU 106 makes this determination based upon the state of the flag that indicates whether or not the player has won a prize with respect to the active pay lines stored in the predetermined memory area of the aforementioned RAM 110. In a case that the flag, which indicates that the player has won a prize, has not been activated, i.e., in a case that the symbol combination matches any one of the "other" combinations, which are combinations other than the particular winning combinations (in a case of "NO" in the determination processing in Step S9), the CPU 106 determines that the particular winning combination has not been formed, and ends this routine. On the other hand, in a case that the flag, which indicates that the player has won a prize, has been activated, i.e., in a case that the symbol combination matches any one of the combinations other than the "other" combinations (in a case of "YES" in the determination processing in Step S9), the flow proceeds to Step 10 according to the instruction from the CPU 106.

In the following Step S10, the CPU 106 determines whether or not the symbol combination thus formed in the combination determination processing performed in Step SO is "BONUS". Specifically, in a case that the particular winning combination is "BONUS" (in a case of "YES" in the determination processing in Step S10), the flow proceeds to Step S11 according to the instruction from the CPU 106. On the other hand, in a case that the particular winning combination is not "BONUS" (in a case of "NO" in the determination processing in Step S10), the flow proceeds to Step S12 according to the instruction from the CPU 106.

In the following Step S11, the CPU 106 performs free game processing. Subsequently, the CPU 106 ends this routine.

In the following Step S12, the CPU 106 pays out coins, the number of which corresponds to the particular winning combination. Specifically, the CPU 106 calculates the number of coins to be paid out that corresponds to the particular symbol combination that provides the prize with reference to the payout table. The CPU 106 reads out the credit amount stored in a predetermined area of the RAM 110. Then, the CPU 106 adds the payout amount thus calculated to the credit amount thus read out, and stores the sum total thus calculated in a predetermined memory region of the RAM 110. The CPU 106 displays the value thus stored on the credit amount display unit 49. Subsequently, the CPU 106 ends this routine.

Figure 9A:
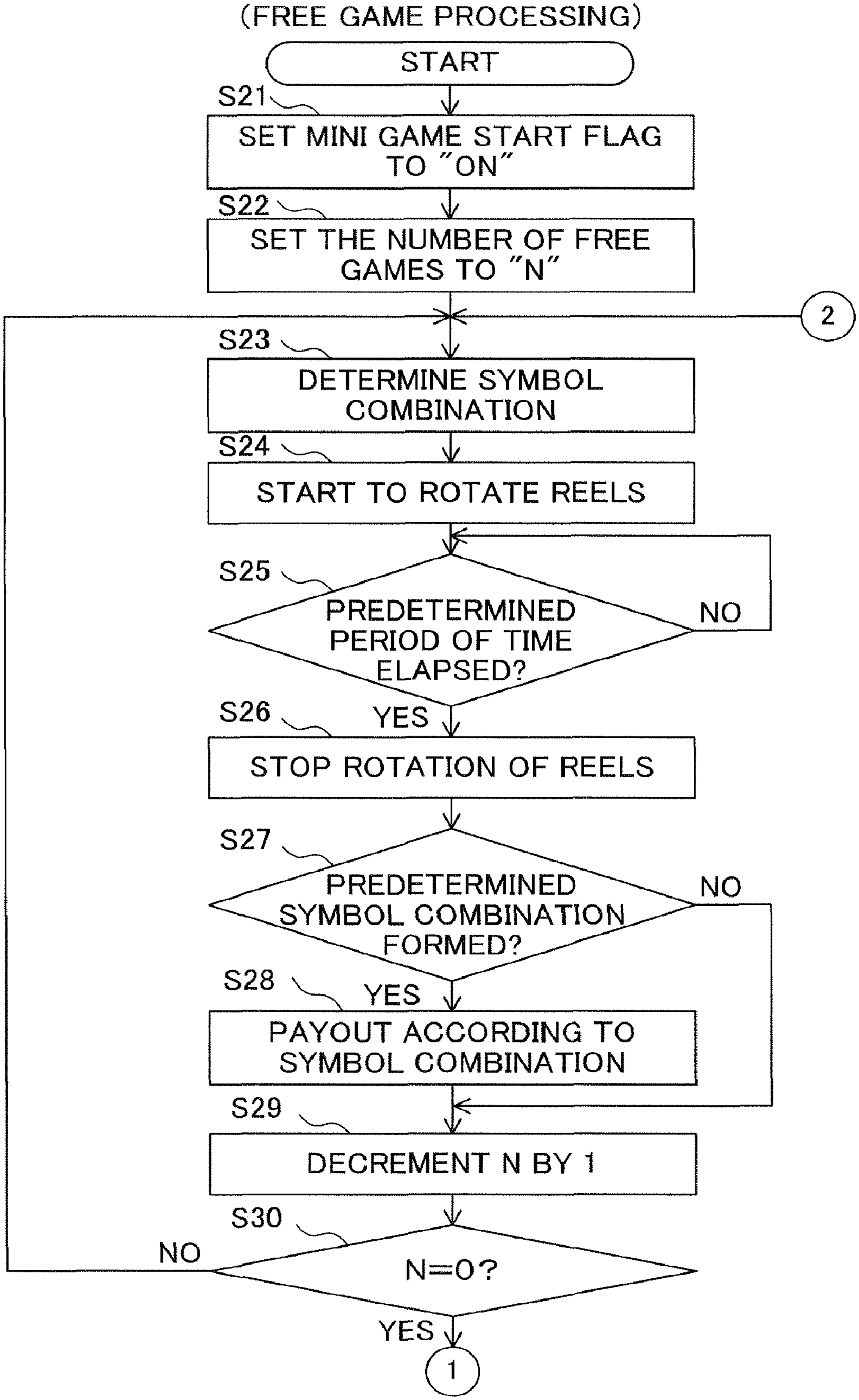
FIG. 9A and FIG. 9B are flowcharts for free game processing executed by the gaming machine according to the embodiment of the present invention.
Figure 9B:
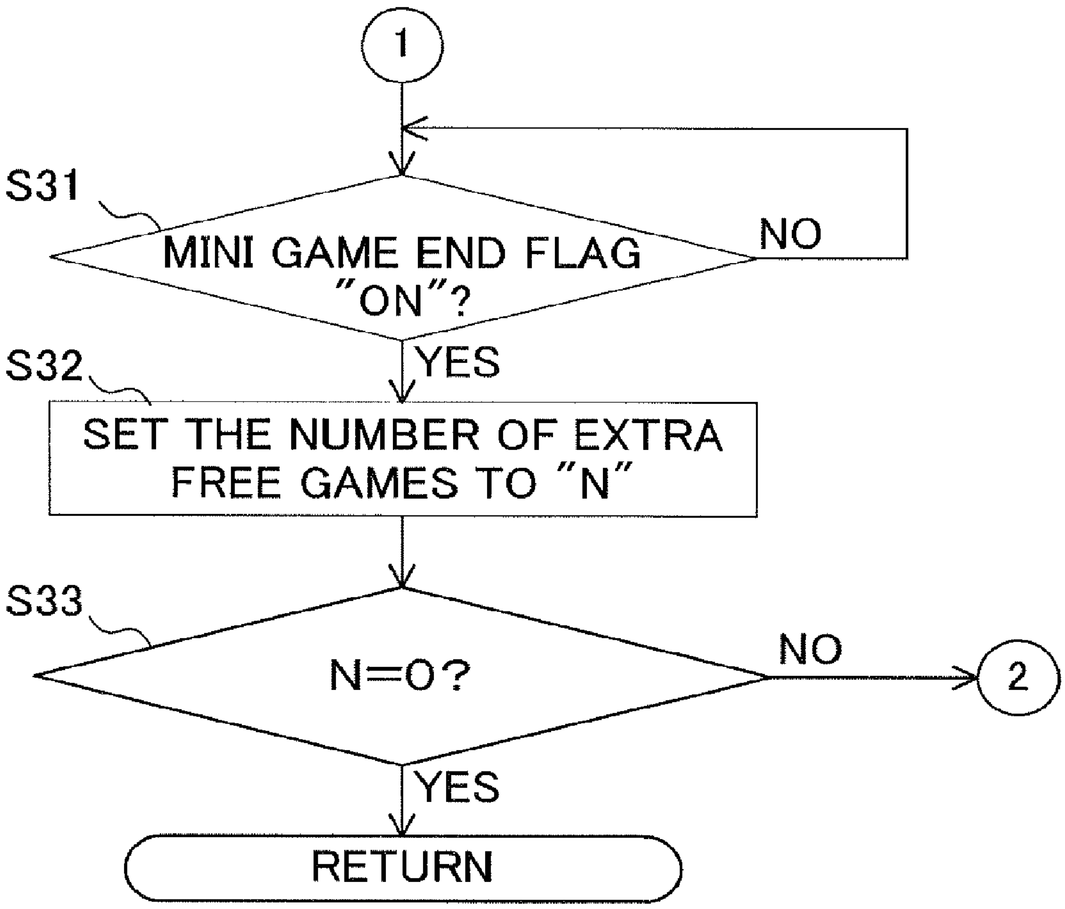

Description will be made regarding the free game processing with reference to FIG. 9A and FIG. 9B.

In Step S21, the CPU 106 sets the mini game start flag to "ON", following which the flow proceeds to Step S22. Specifically, the CPU 106 writes the data that indicates that the mini game start flag is in the ON state to the mini game start flag storage region of the RAM 110.

In Step S22, the CPU 106 sets the number of free games to N, following which the flow proceeds to Step S23. The number of free games is determined in a step where the game mode is switched from the basic game mode to the free game mode.

In the following Step S23, the CPU 106 performs the symbol combination determination processing, following which the flow proceeds to Step S24. Specifically, the symbol combination determination processing is approximately the same as that performed in Step S5 described above with reference to FIG. 8. The point of difference is that the CPU 106 uses a free game random number table (see FIG. 12) as a reference table.

Returning to FIG. 9, in Step S24, the CPU 106 displays an image of the video reels 3A through 3E starting to rotate, following which the flow proceeds to Step S25. Specifically, this processing is the same as that in Step S6 described above with reference to FIG. 8.

Returning to FIG. 9, in Step S25, the CPU 106 determines whether or not a predetermined period of time has elapsed. In a case that the predetermined period of time has elapsed, the flow proceeds to Step S26. On the other hand, in a case that the predetermined period of time has not elapsed, the flow proceeds to Step S25. Specifically, this processing is the same as that in Step S7 described above with reference to FIG. 8.

Returning to FIG. 9, in Step S26, the CPU 106 displays an image of the video reels 3A through 3E stopping to rotate, following which the flow proceeds to Step S27. Specifically, this processing is the same as that in Step S28 described above with reference to FIG. 8.

Returning to FIG. 9, in Step S27, the CPU 106 determines whether or not a predetermined symbol combination has been formed. In a case that the predetermined symbol combination has been formed, the flow proceeds to Step S28. On the other hand, in a case that the predetermined symbol combination has not been formed, the flow proceeds to Step S29. Specifically, this processing is the same as that in Step S29 described above with reference to FIG. 8.

Returning to FIG. 9, in Step S28, the CPU 106 performs payout processing according to the symbol combination, following which the flow proceeds to Step S29. Specifically, the CPU 106 calculates the amount of coins to be paid out according to the symbol combination that provides a prize, with reference to a free game payout table (not shown). The CPU 106 reads out the credit amount stored in a predetermined memory region in the RAM 110. Then, the CPU 106 adds the aforementioned amount thus calculated to the credit amount thus read out, and stores the value thus calculated in a predetermined memory region in the RAM 110. The CPU 106 displays the value thus stored on the credit amount display unit 49.

In Step S29, the CPU 106 decrements by 1 the number of free games N, following which the flow proceeds to Step S30.

In Step S30, the CPU 106 determines whether or not N is equal to 0. In a case that N is not equal to 0, the flow proceeds to Step S23. On the other hand, in a case that N is equal to 0, the flow proceeds to Step S31.

In Step S31, the CPU 106 determines whether or not the mini game end flag is in the ON state. Specifically, the CPU 106 determines whether or not the data that indicates the mini game end flag is in the ON state has been written to the mini game end flag region in the RAM 110. In a case that the CPU 106 has determined that the mini game end flag is in the ON state, the flow proceeds to Step S32 according to the instruction from the CPU 106. On the other hand, in a case that determination has not been made that the mini game end flag is in the ON state, the flow proceeds to Step S31 according to the instruction from the CPU 106.

In Step S32, the CPU 106 sets the number of extra free games to N, following which the flow proceeds to Step S33. Specifically, the CPU 106 sets N to be the number of extra free games determined in Step S50 or Step S52 described later with reference to FIG. 10.

In Step S33, the CPU 106 determines whether or not N is equal to 0. In a case that N is not equal to 0, the flow proceeds to Step S23 according to the instruction from the CPU 106. On the other hand, in a case that N is equal to 0, the CPU 106 ends this routine.

Figure 10A:
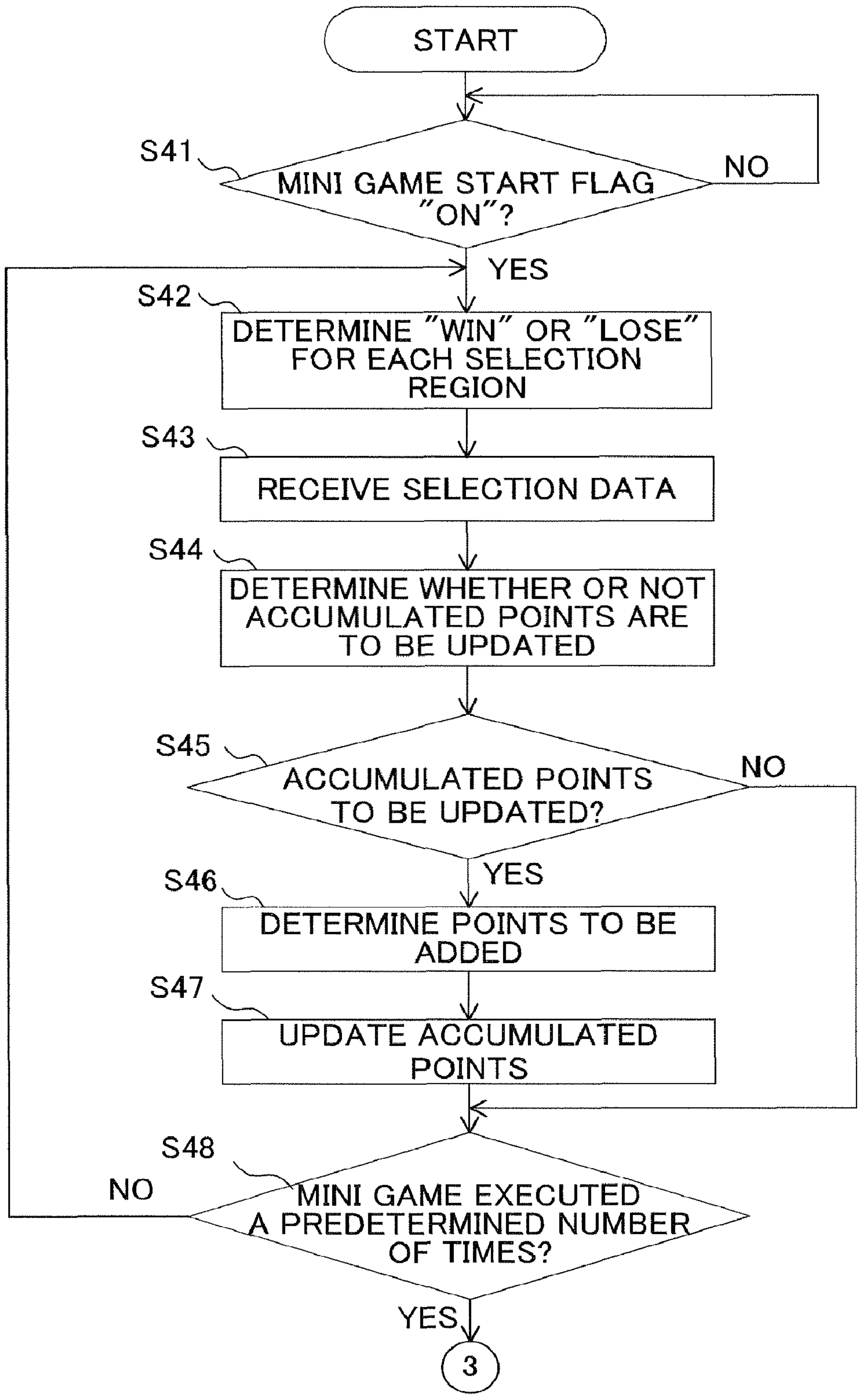
FIG. 10A and FIG. 10B are flowcharts for mini game processing executed by the gaming machine according to the embodiment of the present invention.
Figure 10B:
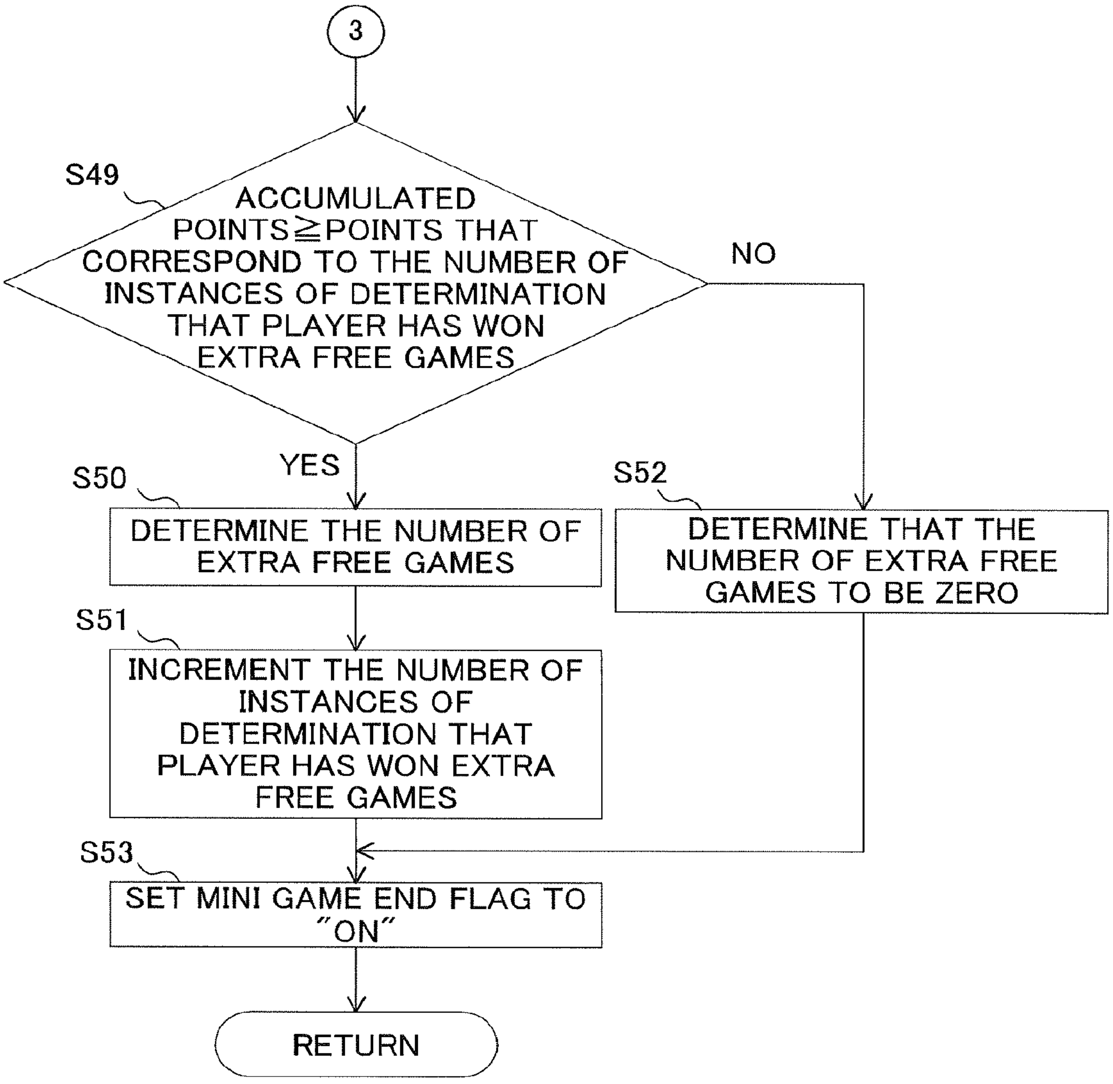

Description will be made regarding mini game processing 1 with reference to FIG. 10A and FIG. 10B.

In Step S41, the CPU 106 determines whether or not the mini game start flag is in the ON state. Specifically, the CPU 106 determines whether or not the data that indicates that the mini game start flag is in the ON state has been written to a mini game start flag region in the RAM 110. In a case that the CPU 106 has determined that the mini game start flag is in the ON state, the flow proceeds to Step S42. On the other hand, in a case that the CPU 106 has not determined that the mini game start flag is in the ON state, the flow proceeds to Step S41.

In Step S42, the CPU 106 determines for each selection region whether selection of the respective region by the user will result in a win or a loss, following which the flow proceeds to Step S43. Here, in an image that provides visual effects for the mini game, the selection regions are "BIG 83"

and "SMALL 84". Specifically, in Step S42, the CPU 106 associates the data that indicates "win" or the data that indicates "lose" with the selection data associated with each selection region. Here, the selection data is the data output from the touch panel 32 according to the player's selecting operation.

In Step S43, the CPU 106 receives the selection data, following which the flow proceeds to Step S44. Specifically, the CPU 106 receives the selection data output from the touch panel 32 via the display/input controller 140.

In Step S44, the CPU 106 determines whether or not the accumulated points are to be updated, following which the flow proceeds to Step S45. Here, the accumulated points are updated according to the results of executing the mini game, and are stored in a predetermined region in the RAM 110. Specifically, in Step S44, in a case that the selection data thus received in Step S43 is associated with "win", the CPU 106 determines that the accumulated points are to be updated. On the other hand, in a case that the selection data thus received in Step S43 is associated with "lose", the CPU 106 determines that the accumulated points are not to be updated.

In Step S45, the CPU 106 checks whether or not determination has been made that the accumulated points are to be updated. In a case that determination has been made that the accumulated points are to be updated, the flow proceeds to step S46. On the other hand, in a case that determination has been made that the accumulated points are not to be updated, the flow proceeds to Step S48. Specifically, in Step S45, the CPU 106 checks whether or not determination has been made in Step S44 that the accumulated points are to be updated.

In Step S46, the CPU 106 determines the number of points to be added to the accumulated points, following which the flow proceeds to Step S47. Specifically, the CPU 106 determines the number of points to be added to the accumulated points, with reference to a points addition determination random number table described later with reference to FIG. 14.

In Step S47, the CPU 106 updates the accumulated points, following which the flow proceeds to Step S48. Specifically, the CPU 106 adds the points which are to be added to the accumulated points, the number of which has been determined in Step S46, to the accumulated points stored in a predetermined storage region in the RAM 110, thereby updating the accumulated points.

In Step S48, the CPU 106 determines whether or not the mini game has been executed a predetermined number of times. In a case that determination has been made that the mini game has been executed the predetermined number of times, the flow proceeds to Step S49. On the other hand, in a case that determination has not been made that the mini game has been executed the predetermined number of times, the flow proceeds to Step S42. Specifically, the CPU 106 reads out the number of instances of execution of the mini game, and determines whether or not the number of instances of execution of the mini game has reached the predetermined number.

In Step S49, the CPU 106 determines whether or not the accumulated points are equal to or greater than the number of points (clear points) that corresponds to the number of instances of determination that the player has won extra free games. In a case that determination has been made that the accumulated points are equal to or greater than the clear points, the flow proceeds to Step S50. On the other hand, in a case that determination has not been made that the accumulated points are equal to or greater than the clear points, the flow proceeds to Step S52. Here, the number of instances of determination that the player has won extra free games is stored in a predetermined storage region in the RAM 110. Specifically, in Step S49, the CPU 106 extracts a clear points calculation ratio from a clear points calculation ratio table described later with reference to FIG. 15. Then, the CPU 106 multiplies the number of free games by the clear points calculation ratio thus extracted, thereby calculating the points that correspond to the number of instances of determination that the player has won extra free games. Furthermore, the CPU 106 determines whether or not the accumulated points are equal to or greater than the aforementioned points thus calculated. Specific description will be made later with reference to FIG. 15.

In Step S50, the CPU 106 determines the number of extra free games, following which the flow proceeds to Step S51. Specifically, the CPU 106 determines the number of extra free games according to the accumulated points, with reference to an extra free games table described later with reference to FIG. 16.

In Step S51, the CPU 106 increments by 1 the number of instances of determination that the player has won extra free games, following which the flow proceeds to Step S53. Specifically, the CPU 106 increments by 1 the number of instances of determination that the player has won extra free games, which is stored in a predetermined storage region in the RAM 110.

In Step S52, the CPU 106 determines that the number of extra free games is to be set to zero, following which the flow proceeds to Step S53.

In step S53, the CPU 106 sets the mini game end flag to the ON state. Specifically, the CPU 106 writes the data that indicates that the mini game end flag is in the ON state to a mini game end flag storage region of the RAM 110. Subsequently, the CPU 106 ends this routine.

Description will be made regarding a basic game random number table with reference to FIG. 11. In the basic game random number table, each particular winning combination is registered in association with a corresponding random number range and its determination probability. With such an arrangement, a random number is extracted in a range of "0" to "65535". Accordingly, in the combination determination processing (Step S5 in FIG. 8), in a case that a random number has been extracted in a range of "0" to "299", for example, determination is made in the gaming machine 13 that a particular winning combination that provides a "BONUS" prize is to be provided as the final result of the basic game. In other words, the probability is "300/65536" that the combination of the symbols when they are stationary will match the particular winning combination for providing the "BONUS" prize.

Description will be made regarding a free game random number table with reference to FIG. 12. In the free game random number table, each particular winning combination is registered in association with a corresponding random number range and its determination probability. With such an arrangement, a random number is extracted in a range of "0" to "65535" Accordingly, in the combination determination processing (Step S23 in FIG. 9), in a case that a random number has been extracted in a range of "0" to "999", for example, determination is made in the gaming machine 13 that a particular winning combination that provides a "BONUS" prize is to be provided as the final result of the basic game. In other words, the probability is "1000/65536" that the combination of the symbols when they are stationary will match the particular winning combination for providing the "BONUS" prize.

Description will be made regarding a win/.lose determination table with reference to FIG. 13. The win/lose determination table is a reference table used by the CPU 106 to select from among the two selection regions, i.e., the region BIG 83 and the region SMALL 84, the selection region that is associated with "win". For example, let us consider a case in which the random number generator 112 has generated a random number "13000" in the step where each region is associated with "win" or "lose" (Step S42 in FIG. 10). In this case, the random number "13000" thus generated belongs to a random number range of "0" to "29999", and accordingly, determination is made that the "BIG" selection region is associated with "win". On the other hand, let us consider a case in which the random number generator 112 has generated a random number "33000". In this case, the random number "33000" thus generated belongs to a random number range of "30000" to "49999", and accordingly, determination is made that the "SMALL" selection region is associated with "win". On the other hand, let us consider a case in which the random number generator 112 has generated a random number "53000". In this case, the random number "53000" thus generated belongs to a random number range of "50000" to "65536", and accordingly, determination is made that the player will lose the mini game. Accordingly, a selection region associated with "win" is not prepared. That is to say, both the region BIG 83 and the region SMALL 84 are associated with "lose".

Description will be made regarding the points addition determination random number table with reference to FIG. 14. The points addition determination random number table is a reference table used by the CPU 106 to determine the points to be added to the accumulated points in the mini game. For example, let us consider a case in which the random number generator 112 has generated a random number "13000" in the step for determining the points to be added to the accumulated points (Step S46 in FIG. 10). In this case, the random number "13000" thus generated belongs to a random number range of "0" to "64999", and accordingly, the CPU 106 determines that the points to be added to the accumulated points are set to "1".

Description will be made regarding the clear points calculation ratio table with reference to FIG. 15. The clear points calculation ratio table is a reference table used by the CPU 106 to calculate the clear points. Let us consider a case in which the number of instances of determination that the user has won extra free games is "0" in the step for determining whether or not the accumulated points are equal to or greater than the points (clear points) that corresponds to the number of instances of determination that the user has won extra free games (Step S49 in FIG. 10), for example. In this case, determination is made that the clear points calculation ratio is set to "30%". Accordingly, in a case that the number of free games is 100, which is the number of extra free games in the subsequent free game mode, for example, the CPU 106 multiplies 100 by "30%" as thus determined, thereby determining that the clear points are "30".

With such an arrangement, the greater the number of instances of determination that the player has won extra free games, the greater the clear points calculation ratio. Accordingly, the greater the number of extra free games, the smaller the probability that the accumulated points will reach the clear points.

Description will be made regarding the extra free games table with reference to FIG. 16. The extra free games table is a reference table used by the CPU 106 to determine the number of extra free games according to the accumulated points. For example, in a case that the accumulated points are "70" in the extra free games determination processing (Step S50 in FIG. 10), the number of extra free games is determined to be "50".

With the present embodiment, the number of extra free games increases according to the increase in the accumulated points obtained as a result of repeated instances of execution of the mini game. Such an arrangement increases the player's level of interest in the mini game provided in the free game. This offers a game with further enhanced entertainment value.

FIGS. 17 through 21 are diagrams which show video images that provide visual effects for the mini game. In FIGS. 17 through 21, a video image for the free game is displayed in the upper display region of the display regions of the liquid crystal display 30. On the other hand, the lower display region displays a video image for the mini game.

Figure 17:
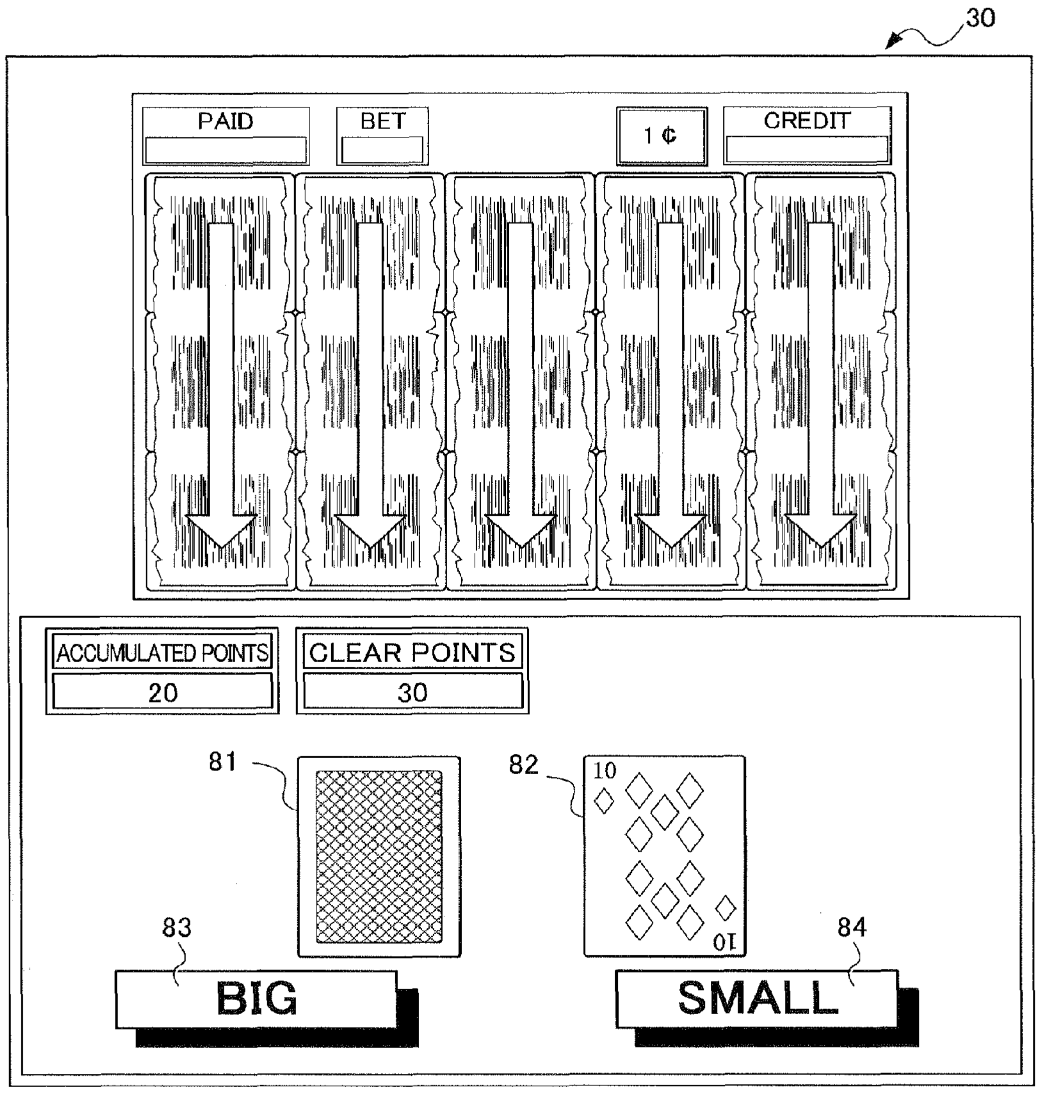
FIG. 17 shows an example of a display screen for a mini game executed by the gaming machine according to the embodiment of the present invention.

Now, description will be made regarding the video image for the mini game shown in FIG. 17. In FIG. 17, a card 81 is displayed such that the back of the card 81 faces the player, and a card 82 is displayed such that the face of the card 82 faces the player. Furthermore, the selection regions, i.e., the region BIG 83 and the region SMALL 84, are displayed. Furthermore, the mini-game state is displayed, which indicates that the accumulated points are 20, and the clear points are 30. Such an arrangement allows the player to make a choice from among: an option in which the player bets that the value of the card 81, the back of which is facing the player, is greater than the value of the card 82, the face of which is facing the player; and an option in which the player bets that the value of the card 81, the back of which is facing the player, is smaller than the value of the card 82, the face of which is facing the player. With such an arrangement, in a case that the player selects the region BIG 83, the player bets that the value of the card 81 is greater than that of the card 82. On the other hand, in a case that the player selects the region SMALL 84, the player bets that the value of the card 81 is smaller than that of the card 82.

Figure 18:
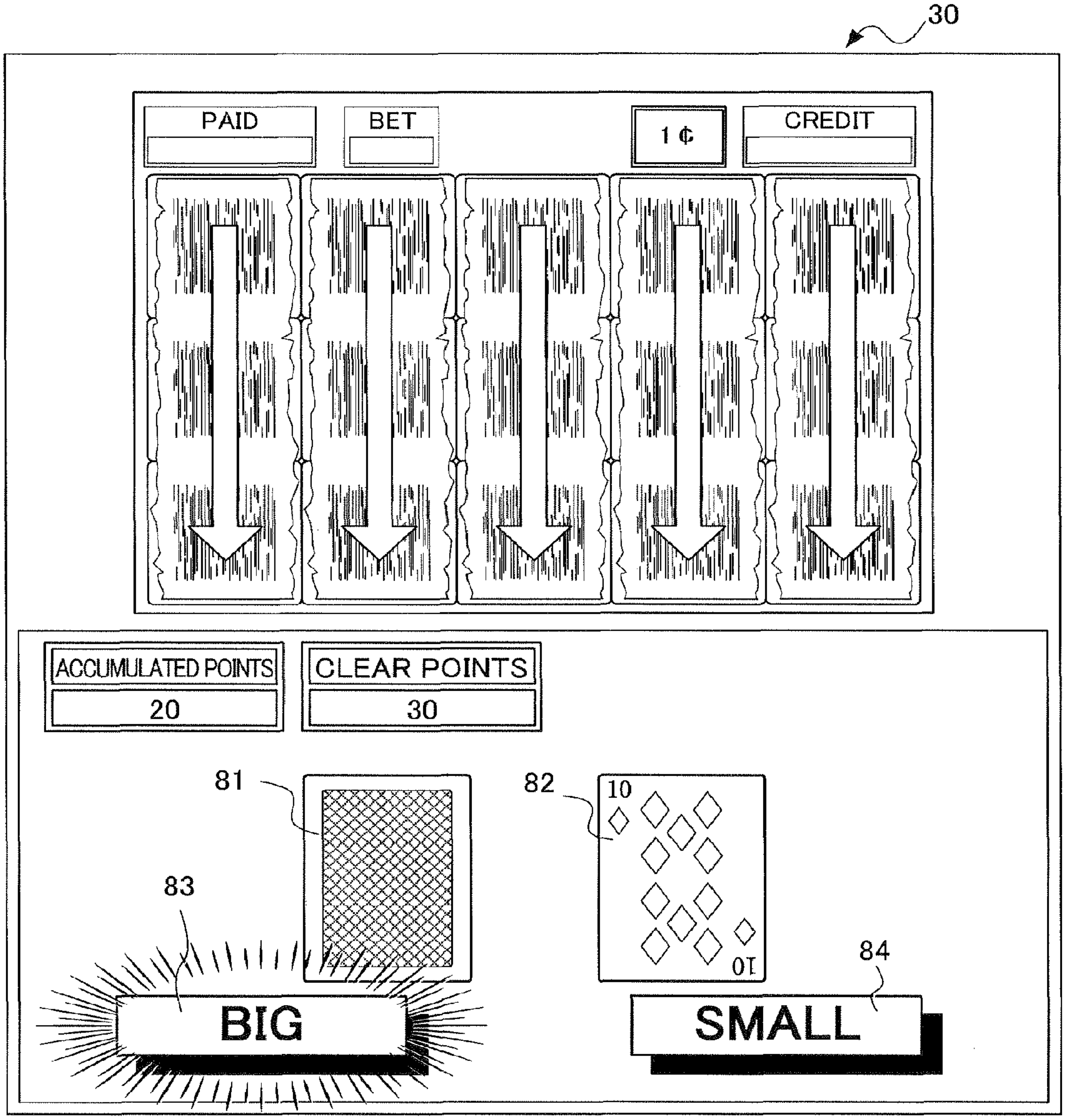
FIG. 18 shows an example of a display screen for the mini game executed by the gaming machine according to the embodiment of the present invention.

Description will be made regarding the video image for the mini game shown in FIG. 18. FIG. 18 shows the state in which the region BIG 83 is highlighted after the player has selected the region BIG 83 in the state shown in FIG. 17.

Figure 19:
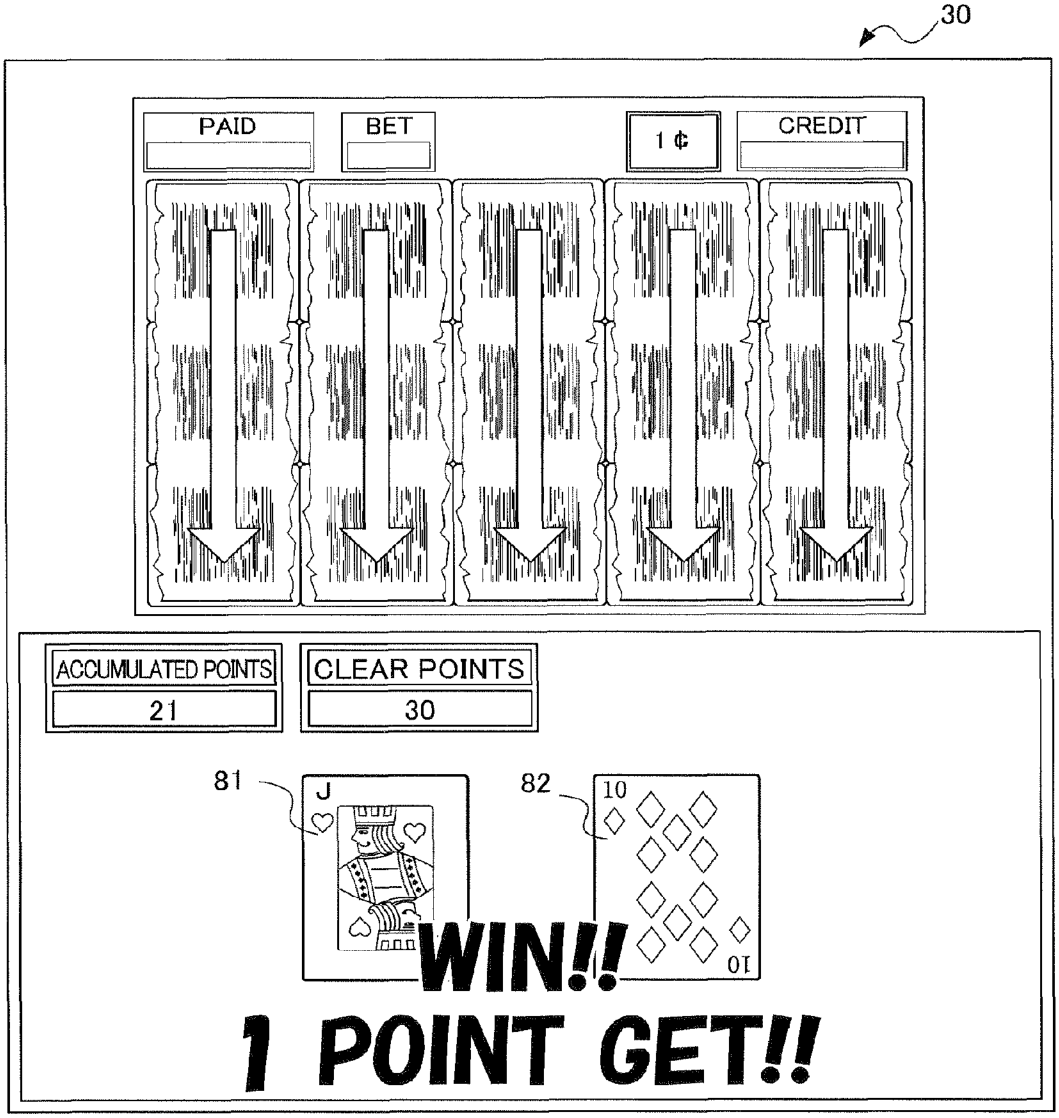
FIG. 19 shows an example of a display screen for the mini game executed by the gaming machine according to the embodiment of the present invention.

Description will be made regarding the video image for the mini game shown in FIG. 19. In FIG. 19, the card 81 is displayed such that the face of the card 81 faces the player, which indicates that the value of the card 81 is "J". In this case, the value of the card 81 is greater than the value of the card 82, i.e., "10". Accordingly, a notice "WIN!! 1 POINT GET!!" is displayed, which indicates that the user has won 1 point. Furthermore, the state of the accumulated points is displayed, which indicates that the accumulated points have been updated to "21". This video image for the mini game is displayed under the following two conditions. One condition is that the selection data associated with the region BIG 83 is associated with the data that indicates "win" in Step S42 shown in FIG. 10. The other condition is that the player has selected the region BIG 83.

Figure 20:
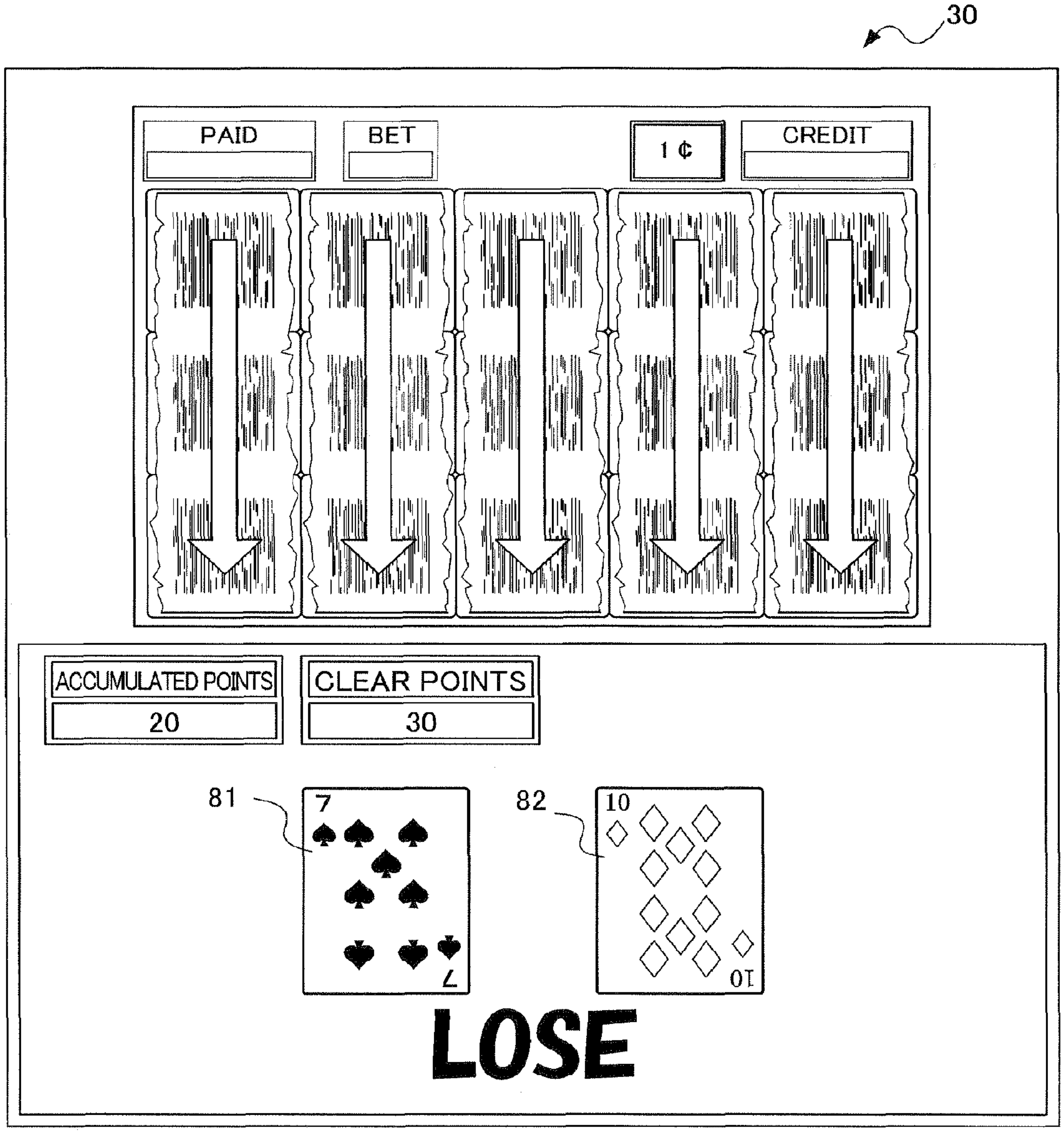
FIG. 20 shows an example of a display screen for the mini game executed by the gaming machine according to the embodiment of the present invention.

Description will be made regarding the video image for the mini game shown in FIG. 20. In FIG. 20, the card 81 is displayed such that the face of the card 81 faces the player, which indicates that the value of the card 81 is "7". In this case, the value of the card 81 is smaller than the value of the card 82, i.e., "10". Accordingly, a notice "LOSE" is displayed. Furthermore, the state of the accumulated points is displayed, which indicates that the accumulated points have not been updated, i.e., the accumulated points remain 20. This video image for the mini game is displayed under the following two conditions. One condition is that the selection data associated with the region BIG 83 is associated with the data that indicates "lose" in Step S42 shown in FIG. 10. The other condition is that the player has selected the region BIG 83.

Figure 21:
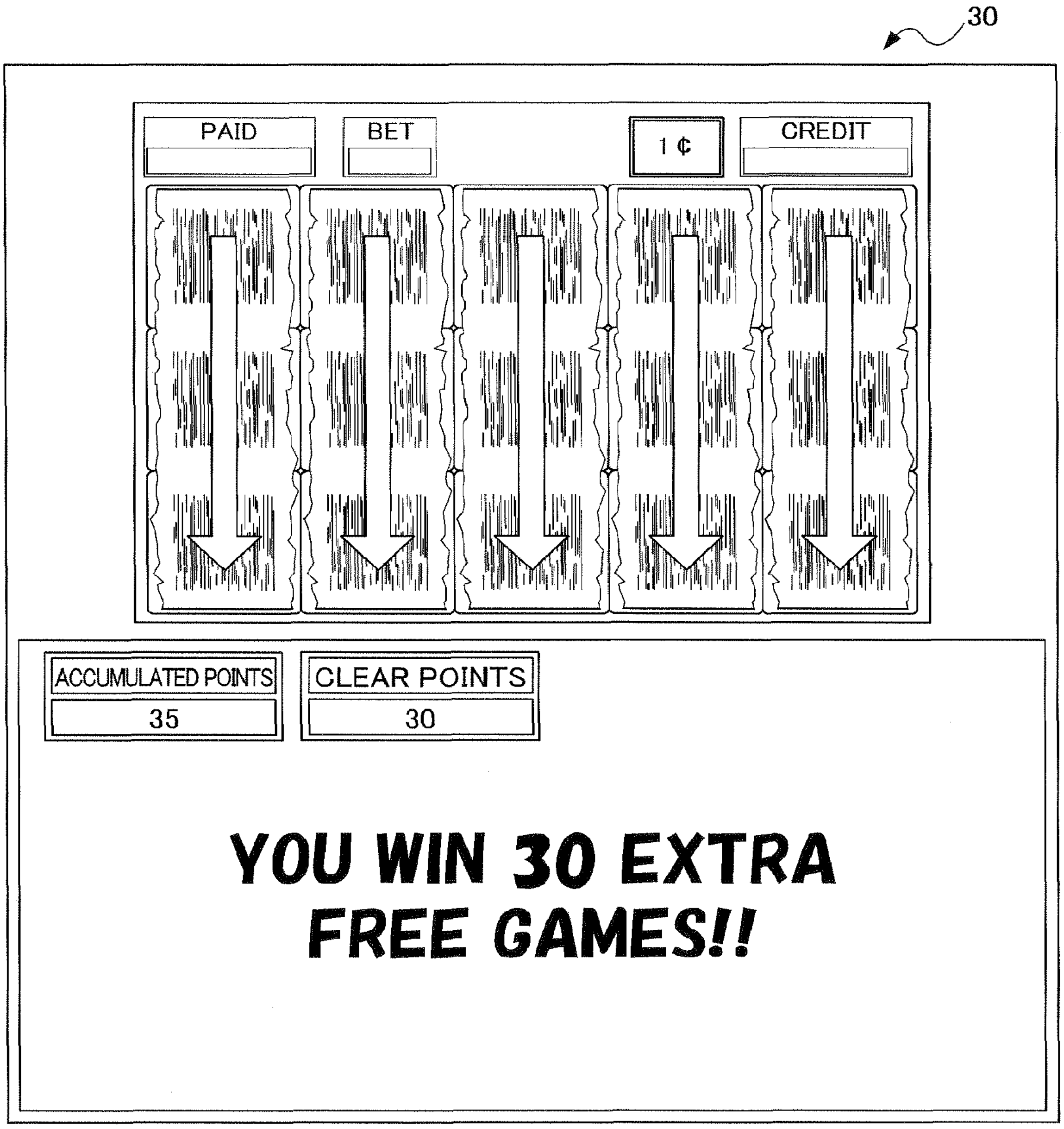
FIG. 21 shows an example of a display screen for the mini game executed by the gaming machine according to the embodiment of the present invention.

Description will be made regarding the video image for the mini game shown in FIG. 21. FIG. 21 shows the state in which the accumulated points are 35, which is greater than the clear points, after the mini game has ended. Furthermore, a notice "Win 30 extra free games!!" is displayed, which indicates that the number of extra free games has been determined to be 30. This video image for the mini game is displayed under the following condition. That is to say, the aforementioned condition is that the number of extra free games determined in the extra free games determination processing (Step S50 in FIG. 10) has been determined to be 30.

While the gaming machine according to the present invention has been described above by way of embodiments, it should be clearly understood that the embodiments are merely a listing of specific examples, and that the embodiments in no way restrict the present invention, and that the specific configurations such as the means may be modified and altered as suitable. Moreover, it should be understood that the advantages described in association with the embodiments are merely a listing of most preferred advantages according to the present invention, and that the advantages of the present invention are by no means restricted to those described in association with the embodiments of the present invention.

For example, description has been made in the present embodiment regarding an arrangement in which a video image for the free game is displayed in the upper display region of the liquid crystal display 30, and a video image for the mini game is displayed in the lower display region thereof. However, the present invention is not restricted to such an arrangement. Also, an arrangement may be made in which a video image for the mini game is displayed in the upper display region of the liquid crystal display 30, and a video image for the free game is displayed in the lower display region thereof. Also, a video image for the mini game may be displayed on the liquid crystal display 40.

Description has been made in the present embodiment regarding an arrangement in which the mini game provides two selection options. However, the present invention is not restricted to such an arrangement. The mini game may provide three or more selection options.

Description has been made in the present embodiment regarding an arrangement in which the mini game is executed only in a case that the game mode has been switched to the free game mode. However, the present invention is not restricted to such an arrangement. Also, an arrangement may be made in which the mini game is executed every time the free game is executed.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A gaming machine comprising:

memory which stores accumulated points that are updated according to the results of a mini game;

a display which displays a plurality of selection regions;

a first input device which outputs the selection data associated with the selection region selected by a player from among the plurality of selection regions displayed on said display;

a second input device which outputs a signal that starts a basic game; and a controller which provides:

(a) a function whereby, upon receipt of the signal from said second input device, the basic game is started;

(b) a function whereby, in a case that a predetermined condition has been satisfied, the game mode is switched from the basic game mode to the free game mode;

(c) a function whereby, in a case that the game mode has been switched to the free game mode, the mini game is executed;

(d) a function whereby, each time the mini game is executed, the selection data is received from said first input device, and determination is made based upon the received selection data as to whether the accumulated points are to be updated;

(e) a function whereby, in a case that determination has been made that the accumulated points are to be updated, the number of points to be added to the accumulated points is determined based upon a random number and random number ranges of a points addition determination random number table, and the determined number of points is added to the accumulated points, thereby updating the accumulated points;

(f) a function whereby, after the mini game has been executed a predetermined number of times, the number of extra free games is determined according to the updated accumulated points; and (g) a function of executing the extra free game the determined number of times.

2. The gaming machine according to claim 1, wherein the plurality of selection regions are displayed, during the mini game, outside a region in which a video image pertaining to the basic game and the free game is displayed.

3. A gaming machine comprising:

memory which stores accumulated points that are updated according to the results of a mini game;

a display which displays a plurality of selection regions;

a first input device which outputs the selection data associated with the selection region selected by a player from among the plurality of selection regions displayed on said display;

a second input device which outputs a signal that starts a basic game; and a controller which provides:

(a) a function whereby, upon receipt of the signal from said second input device, the basic game is started;

(b) a function whereby, in a case that a predetermined condition has been satisfied, the game mode is switched from the basic game mode to the free game mode;

(c) a function whereby, in a case that the game mode has been switched to the free game mode, the mini game is executed;

(d) a function whereby, each time the mini game is executed, the selection data is received from said first input device, and determination is made based upon the received selection data as to whether the accumulated points are to be updated;

(e) a function whereby, in a case that determination has been made that the accumulated points are to be updated, the number of points to be added to the accumulated points is determined based upon a random number and random number ranges of a points addition determination random number table, and the determined number of points is added to the accumulated points, thereby updating the accumulated points;

(f) a function whereby, in a case that the updated accumulated points are at least equal to a predetermined number of points after the mini game has been executed a predetermined number of times, the number of extra free games is determined according to the updated accumulated points; and (g) a function of executing the extra free game the determined number of times.

4. A gaming machine comprising:

memory which stores accumulated points that are updated according to the results of a mini game;

a display which displays a plurality of selection regions;

a first input device which outputs the selection data associated with the selection region selected by a player from among the plurality of selection regions displayed on said display;

a counter which stores the number of instances of determination that the player has won extra free games;

a second input device which outputs a signal that starts a basic game; and a controller which provides:

(a) a function whereby, upon receipt of the signal from said second input device, the basic game is started;

(b) a function whereby, in a case that a predetermined condition has been satisfied, the game mode is switched from the basic game mode to the free game mode;

(c) a function whereby, in a case that the game mode has been switched to the free game mode, the mini game is executed;

(d) a function whereby, each time the mini game is executed, the selection data is received from said first input device, and determination is made based upon the received selection data as to whether the accumulated points are to be updated;

(e) a function whereby, in a case that determination has been made that the accumulated points are to be updated, the number of points to be added to the accumulated points is determined based upon a random number and random number ranges of a points addition determination random number table, and the determined number of points is added to the accumulated points, thereby updating the accumulated points;

(f) a function whereby, after the mini game has been executed a predetermined number of times, in a case that the updated accumulated points are at least equal to the number of points that correspond to the number of instances of determination that the player has won extra free games, the number of extra free games is determined according to the updated accumulated points;

(g) a function of incrementing by a predetermined number the number of instances of determination that the player has won extra free games; and (h) a function of executing the extra free game the determined number of times.

5. The gaming machine according to claim 4, wherein the number of points that correspond to the number of instances of determination that the player has won extra free games is proportional to a clear points calculation ratio, and the number of points that correspond to the number of instances of determination that the player has won extra free games is determined by multiplying the number of free games by the clear points calculation ratio.

* * * * *